(12) United States Patent
Liu

(10) Patent No.: US 10,691,319 B2
(45) Date of Patent: Jun. 23, 2020

(54) INSTANT-MESSAGING-BASED PICTURE SENDING METHOD AND DEVICE

(71) Applicant: Alibaba Group Holding Limited, George Town (KY)

(72) Inventor: Jiayin Liu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/031,306

(22) Filed: Jul. 10, 2018

(65) Prior Publication Data

US 2019/0018577 A1    Jan. 17, 2019

(30) Foreign Application Priority Data

Jul. 11, 2017   (CN) .......................... 2017 1 0561491

(51) Int. Cl.
*G06Q 30/00* (2012.01)
*G06F 3/0484* (2013.01)
(Continued)

(52) U.S. Cl.
CPC ...... *G06F 3/04845* (2013.01); *G06F 3/04817* (2013.01); *H04L 51/04* (2013.01); *H04L 51/08* (2013.01); *H04L 51/10* (2013.01)

(58) Field of Classification Search
CPC ... G06F 3/04817; G06F 3/04845; H04L 51/04
(Continued)

(56) References Cited

U.S. PATENT DOCUMENTS

2004/0162877 A1    8/2004   Van Dok et al.
2006/0085787 A1    4/2006   Breslaw
(Continued)

FOREIGN PATENT DOCUMENTS

CN    101046722    10/2007
CN    2008500573    1/2008
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Thomas J Lett
(74) *Attorney, Agent, or Firm* — Fish & Richardson P.C.

(57) ABSTRACT

At a first computing device, a target image is identified. The target image is provided in a display on the first computing device in a communication area displaying a conversation between a first user using the first computing device and a second user using a second computing device. An indication is received that the first user has initiated editing of the target image. An edit control listing editing options is provided for display in the communication area. At the first computing device, a user selection is received of a particular editing option selected from the editing options. An edited target image is created by editing the target image using an edit operation associated with the particular editing option. The edited target image is provided to the second computing device and the communication area is updated to display the edited target image.

17 Claims, 22 Drawing Sheets

(51) Int. Cl.
*H04L 12/58* (2006.01)
*G06F 3/0481* (2013.01)

(58) Field of Classification Search
USPC .......................................................... 345/619
See application file for complete search history.

(56) References Cited

U.S. PATENT DOCUMENTS

| | | | |
|---|---|---|---|
| 2011/0217998 A1* | 9/2011 | Lee .................... | H04M 1/00 455/466 |
| 2012/0059787 A1 | 3/2012 | Brown et al. | |
| 2012/0190388 A1 | 7/2012 | Castleman et al. | |
| 2017/0336929 A1* | 11/2017 | Chaudhri ............. | G06F 3/04817 |
| 2017/0357432 A1* | 12/2017 | King ..................... | H04L 51/10 |
| 2018/0107279 A1* | 4/2018 | Pirzadeh ................. | G06F 3/016 |

FOREIGN PATENT DOCUMENTS

| | | |
|---|---|---|
| CN | 102368196 | 3/2012 |
| CN | 102426568 | 4/2012 |
| CN | 102811184 | 12/2012 |
| CN | 104780093 | 7/2015 |
| CN | 105119812 | 12/2015 |
| CN | 106874249 | 6/2017 |
| WO | 2011088756 | 7/2011 |
| WO | WO 2011085248 | 7/2011 |
| WO | WO 2016048992 | 3/2016 |

OTHER PUBLICATIONS

Nakamoto, "Bitcoin: A Peer-to-Peer Electronic Cash System," www.bitcoin.org, 2005, 9 pages.
PCT International Preliminary Report on Patentability in International Application No. PCT/US2018/041512, dated Oct. 2, 2019, 6 pages.
PCT International Search Report and Written Opinion in International Application No. PCT/US2018/041512, dated Oct. 4, 2018, 12 pages.

* cited by examiner

INSTANT-MESSAGING-BASED PICTURE SENDING METHOD AND DEVICE

This application claims priority to Chinese Patent Application No. 201710561491.0, filed on Jul. 11, 2017, which is hereby incorporated by reference in its entirety.

TECHNICAL FIELD

The present application relates to the field of instant messaging, and in particular, to an instant-messaging-based picture sending method and device.

BACKGROUND

Rapid development of the Internet technology brings various communications software, such as QQ, WeChat, and IP Messenger. The communications software can allow at least two users to communicate with each other by using the communications software's text data, file data, voice data, video data, etc. Emergence of the communications software greatly facilitates communication in daily life.

To provide better services for a user, the communications software provides the user with various emoji pictures, and allows at least two users to send an emoji picture to each other during communication. For example, user A sends an emoji picture to user B. When user A communicates with user B by using the communications software, the communications software can display an emoji picture library to user A when user A enters chat information. When user A wants to send an emoji picture, user A can select an emoji picture that user A wants to send from the emoji picture library, and determine to send the emoji picture. A server corresponding to the communications software can send the emoji picture selected by user A to user B. As a result, the emoji picture is transferred from user A to user B.

However, in actual application, when a user sends an emoji picture, after the user selects an emoji picture that the user wants to send from the emoji picture library, the communications software can send the selected emoji picture only based on a specified pattern of the emoji picture. Consequently, user experience is relatively poor due to the simple emoji picture sending method.

SUMMARY

Implementations of the present application provide an instant-messaging-based picture sending method and device to resolve a problem in the existing technology that user experience is relatively poor due to a simple emoji picture sending method.

The implementations of the present application provide an instant-messaging-based emoji picture sending method, including: receiving, by a first communications client device, an emoji picture sent by a second communications client device; receiving, by the first communications client device, an editing instruction for the emoji picture; editing, by the first communications client device, the emoji picture based on the editing instruction in a session window where the first communications client device interacts with the second communications client device, to obtain an edited emoji picture; and sending, by the first communications client device, the edited emoji picture to the second communications client device.

The implementations of the present application provide an instant-messaging-based emoji picture sending device, including: a picture receiving unit, configured to receive an emoji picture sent by a second communications client device; an instruction receiving unit, configured to receive an editing instruction for the emoji picture; an editing unit, configured to edit the emoji picture based on the editing instruction in a session window where a first communications client device interacts with the second communications client device, to obtain an edited emoji picture; and a sending unit, configured to send the edited emoji picture to the second communications client device.

The implementations of the present application provide an instant-messaging-based emoji picture sending apparatus, including a memory and a processor, where the memory is configured to store a program; and the processor is configured to execute the program stored in the memory, and specifically perform the following method: receiving an emoji picture sent by a second communications client device; receiving an editing instruction for the emoji picture; editing the emoji picture based on the editing instruction in a session window where a first communications client device interacts with the second communications client device, to obtain an edited emoji picture; and sending the edited emoji picture to the second communications client device.

The implementations of the present application provide a computer readable storage medium, where the computer readable storage medium stores one or more programs, and when the one or more programs are executed by an electronic device that includes a plurality of application programs, the electronic device performs the following method: receiving an emoji picture sent by a second communications client device; receiving an editing instruction for the emoji picture; editing the emoji picture based on the editing instruction in a session window, where a first communications client device interacts with the second communications client device, to obtain an edited emoji picture; and sending the edited emoji picture to the second communications client device.

The implementations of the present application further provide an instant-messaging-based emoji picture sending method, including: receiving, by a first communications client device in a session window, an emoji picture sent by a second communications client device, where the session window is a session window of a group; receiving, by the first communications client device, an editing instruction for the emoji picture; editing, by the first communications client device, the emoji picture in the session window based on the editing instruction, to obtain an edited emoji picture; and sending, by the first communications client device, the edited emoji picture in the session window.

The implementations of the present application further provide an instant-messaging-based emoji picture sending device, including: a picture receiving unit, configured to receive, in a session window, an emoji picture sent by a second communications client device, where the session window is a session window of a group; an instruction receiving unit, configured to receive an editing instruction for the emoji picture; an editing unit, configured to edit the emoji picture in the session window based on the editing instruction, to obtain an edited emoji picture; and a sending unit, configured to send the edited emoji picture in the session window.

The implementations of the present application further provide an instant-messaging-based emoji picture sending apparatus, including a memory and a processor, where the memory is configured to store a program; and the processor is configured to execute the program stored in the memory, and specifically perform the following method: receiving, in a session window, an emoji picture sent by a second communications client device, where the session window is a session window of a group; receiving an editing instruction for the emoji picture; editing the emoji picture in the session window based on the editing instruction, to obtain an edited emoji picture; and sending the edited emoji picture in the session window.

The implementations of the present application further provide a computer readable storage medium, where the computer readable storage medium stores one or more programs, and when the one or more programs are executed by an electronic device that includes a plurality of application programs, the electronic device performs the following method: receiving, in a session window, an emoji picture sent by a second communications client device, where the session window is a session window of a group; receiving an editing instruction for the emoji picture; editing the emoji picture in the session window based on the editing instruction, to obtain an edited emoji picture; and sending the edited emoji picture in the session window.

At least one of the previous technical solutions used in the implementations of the present application can achieve the following beneficial effects:

In the technical solutions provided in the implementations of the present application, after the user uses the first communications client device to receive the emoji picture sent by the second communications client device, if the user wants to send the emoji picture to the second communications client device, the user can send the editing instruction for the emoji picture to the first communications client device. After receiving the editing instruction, the first communications client device can edit the emoji picture in the session window, where the first communications client device interacts with the second communications client device, and send the emoji picture to another user. As such, when sending an emoji picture, a user can edit a received emoji picture in the session window, and then send an edited emoji picture. Because the user can edit and then send the emoji picture, compared with the existing technology, there can be diverse emoji picture sending methods, so as to effectively improve user experience.

In addition, because the user can send a received emoji picture without downloading the emoji picture, user operations can be simplified, and it is more convenient for the user to send the emoji picture.

The implementations of the present application provide an instant-messaging-based picture sending method, including: determining, by a first communications client device, a target picture; receiving, by the first communications client device, an editing instruction for the target picture; editing, by the first communications client device, the target picture in a session window based on the editing instruction, to obtain an edited picture, where the session window is a session window, where the first communications client device interacts with another communications client, or a session window where the first communications client device interacts with other communications clients; and sending, by the first communications client device, the edited picture in the session window.

The implementations of the present application provide an instant-messaging-based picture sending device, including: a determining unit, configured to determine a target picture; a receiving unit, configured to receive an editing instruction for the target picture; an editing unit, configured to edit the target picture in a session window based on the editing instruction, to obtain an edited picture, where the session window is a session window, where a first communications client device interacts with another communications client, or a session window where a first communications client device interacts with other communications clients; and a sending unit, configured to send the edited picture in the session window.

The implementations of the present application provide an instant-messaging-based picture sending apparatus, including a memory and a processor, where the memory is configured to store a program; and the processor is configured to execute the program stored in the memory, and specifically perform the following method: determining a target picture; receiving an editing instruction for the target picture; editing the target picture in a session window based on the editing instruction, to obtain an edited picture, where the session window is a session window, where a first communications client device interacts with another communications client, or a session window where a first communications client device interacts with other communications clients; and sending the edited picture in the session window.

The implementations of the present application provide a computer readable storage medium, where the computer readable storage medium stores one or more programs, and when the one or more programs are executed by an electronic device that includes a plurality of application programs, the electronic device performs the following method: determining a target picture; receiving an editing instruction for the target picture; editing the target picture in a session window based on the editing instruction, to obtain an edited picture, where the session window is a session window, where a first communications client device interacts with another communications client, or a session window where a first communications client device interacts with other communications clients; and sending the edited picture in the session window.

The implementations of the present application further provide an instant-messaging-based picture sending method, including: determining, by a first communications client device, a target picture; editing, by the first communications client device, the target picture in a session window based on attribute information of a user who uses the first communications client device, to obtain an edited picture, where the session window is a session window, where the first communications client device interacts with another communications client, or a session window where the first communications client device interacts with other communications clients; and sending, by the first communications client device, the edited picture in the session window.

The implementations of the present application further provide an instant-messaging-based picture sending device, including: a determining unit, configured to determine a target picture; an editing unit, configured to edit the target picture in a session window based on attribute information of a user who uses a first communications client device, to obtain an edited picture, where the session window is a session window, where the first communications client device interacts with another communications client, or a session window where the first communications client device interacts with other communications clients; and a sending unit, configured to send the edited picture in the session window.

The implementations of the present application further provide an instant-messaging-based picture sending apparatus, including a memory and a processor, where the memory is configured to store a program; and the processor is configured to execute the program stored in the memory, and specifically perform the following method: determining a target picture; editing the target picture in a session window based on attribute information of a user who uses a first communications client device, to obtain an edited picture, where the session window is a session window, where the first communications client device interacts with another communications client, or a session window where the first communications client device interacts with other communications clients; and sending the edited picture in the session window.

The implementations of the present application further provide a computer readable storage medium, where the computer readable storage medium stores one or more programs, and when the one or more programs are executed by an electronic device that includes a plurality of application programs, the electronic device performs the following method: determining a target picture; editing the target picture in a session window based on attribute information of a user who uses a first communications client device, to obtain an edited picture, where the session window is a session window, where the first communications client device interacts with another communications client, or a session window where the first communications client device interacts with other communications clients; and sending the edited picture in the session window.

In the technical solutions provided in the implementations of the present application, when using the first communications client device to send the target picture, the user can send the editing instruction for the target picture to the first communications client device. The first communications client device can edit the target picture based on the editing instruction in the session window where the first communications client device interacts with another communications client, or in the session window where the first communications client device interacts with other communications clients, and send the edited picture in the session window after obtaining the edited picture. As such, when a user sends an emoji picture by using the picture sending method provided in the implementations of the present application, the user can edit, in the session window, the emoji picture that needs to be sent, and send an edited emoji picture to another user. Therefore, compared with the existing technology, there can be diverse emoji picture sending methods, so as to effectively improve user experience.

BRIEF DESCRIPTION OF DRAWINGS

The accompanying drawings described here are intended to provide a further understanding of the present application, and constitute a part of the present application. The illustrative implementations of the present application and descriptions of the implementations are intended to describe the present application, and do not constitute limitations on the present application. In the accompanying drawings.

DESCRIPTION OF EMBODIMENTS

An emoji picture can be a picture that can express expression or mood of a user. In existing technology, to provide better services for a user, communications software provides the user with a large number of emoji pictures, and allows the user to send the emoji pictures provided by the communications software when the user uses the communications software to communicate with another user. When using the communications software to send an emoji picture to another user, the user needs to download emoji pictures to be sent, and after downloading is complete, the user can select an emoji picture that the user wants to send, so that the communications software can send the emoji picture selected by the user based on a specified pattern of the emoji picture.

Figure 1:
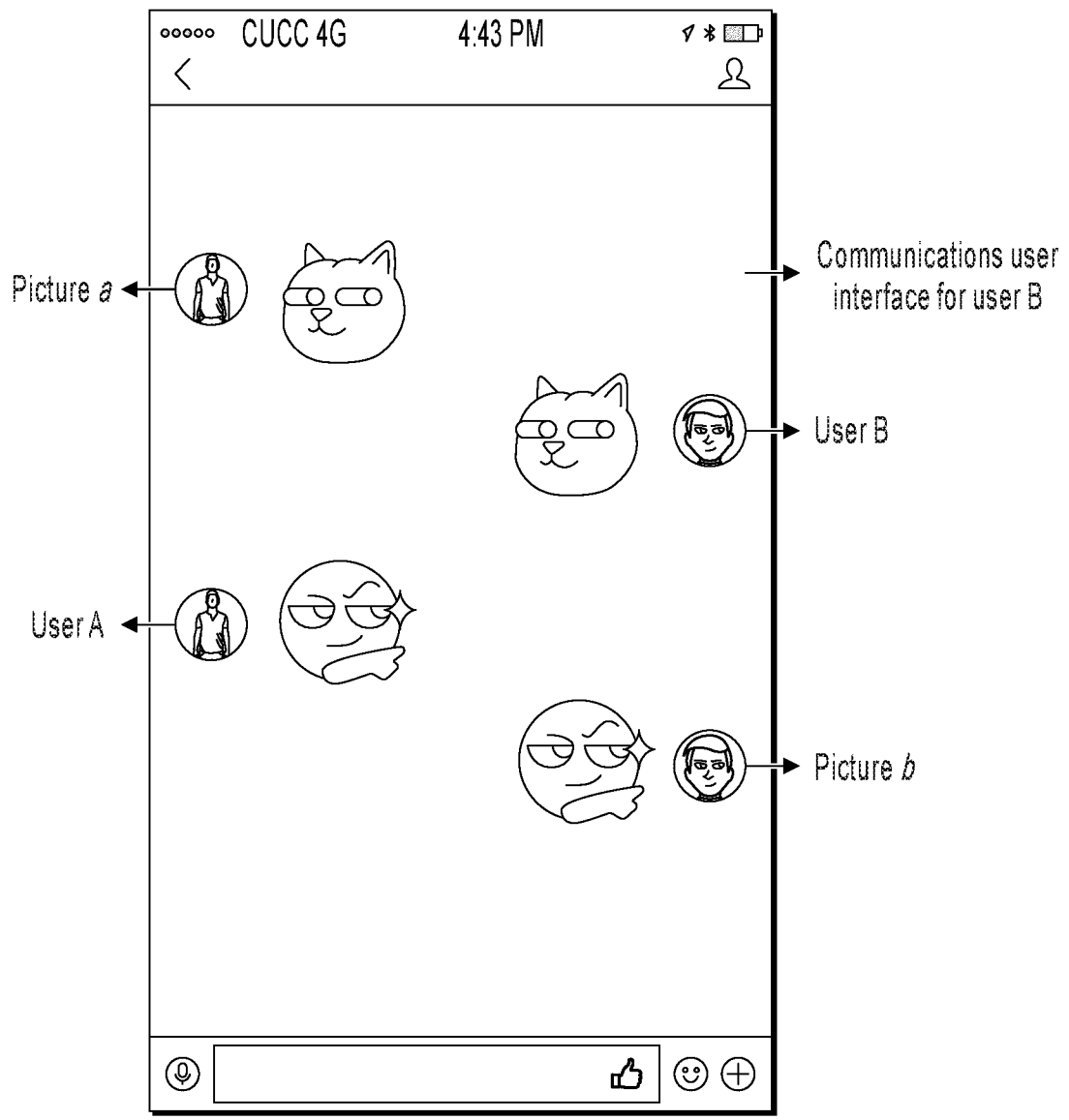
FIG. 1 is a schematic diagram illustrating sending an emoji picture in the existing technology.

As shown in FIG. 1, FIG. 1 is a schematic diagram illustrating sending an emoji picture in the existing technology. In FIG. 1, after user A sends a picture a to user B, user B can send the picture a to user A. Afterwards, after user A sends a picture b to user B, user B can also send the picture b to user A. As shown in FIG. 1, both user A and user B send the picture a and the picture b based on specified patterns of the picture a and the picture b.

However, in actual application, when sending the picture a, user B prefers that the "dog head" in the picture a looks at a profile picture of user A, so that an object (user A) "despised" by the "dog head" in the picture a is consistent with user A that the "dog head" looks at. Likewise, user B also prefers that a face in the picture b looks at the profile picture of user A. Apparently, in the existing picture sending method, the picture a and the picture b cannot be sent in the previous way.

To send the picture a and the picture b in FIG. 1 in the previous way, the implementations of the present application provide an instant-messaging-based picture sending method and device. The method includes: receiving, by a first communications client device, an emoji picture sent by a second communications client device; receiving, by the first communications client device, an editing instruction for the emoji picture; editing, by the first communications client device, the emoji picture based on the editing instruction in a session window, where the first communications client device interacts with the second communications client device, to obtain an edited emoji picture; and sending, by the first communications client device, the edited emoji picture to the second communications client device.

Therefore, a user can edit a received emoji picture, and then send an edited emoji picture. Therefore, compared with the existing technology, there can be diverse emoji picture sending methods, so as to effectively improve user experience.

The following clearly and completely describes the technical solutions in the present application with reference to the specific implementations of the present application and the corresponding accompanying drawings. Apparently, the described implementations are merely some but not all of the implementations of the present application. Other implementations obtained by a person of ordinary skill in the art based on the implementations of the present application without creative efforts shall fall within the protection scope of the present application.

The instant-messaging-based picture sending method provided in the implementations of the present application can be implemented by communications software having an instant messaging function.

The technical solutions provided in the implementations of the present application are described in detail below with reference to the accompanying drawings.

Implementation 1

Figure 2:
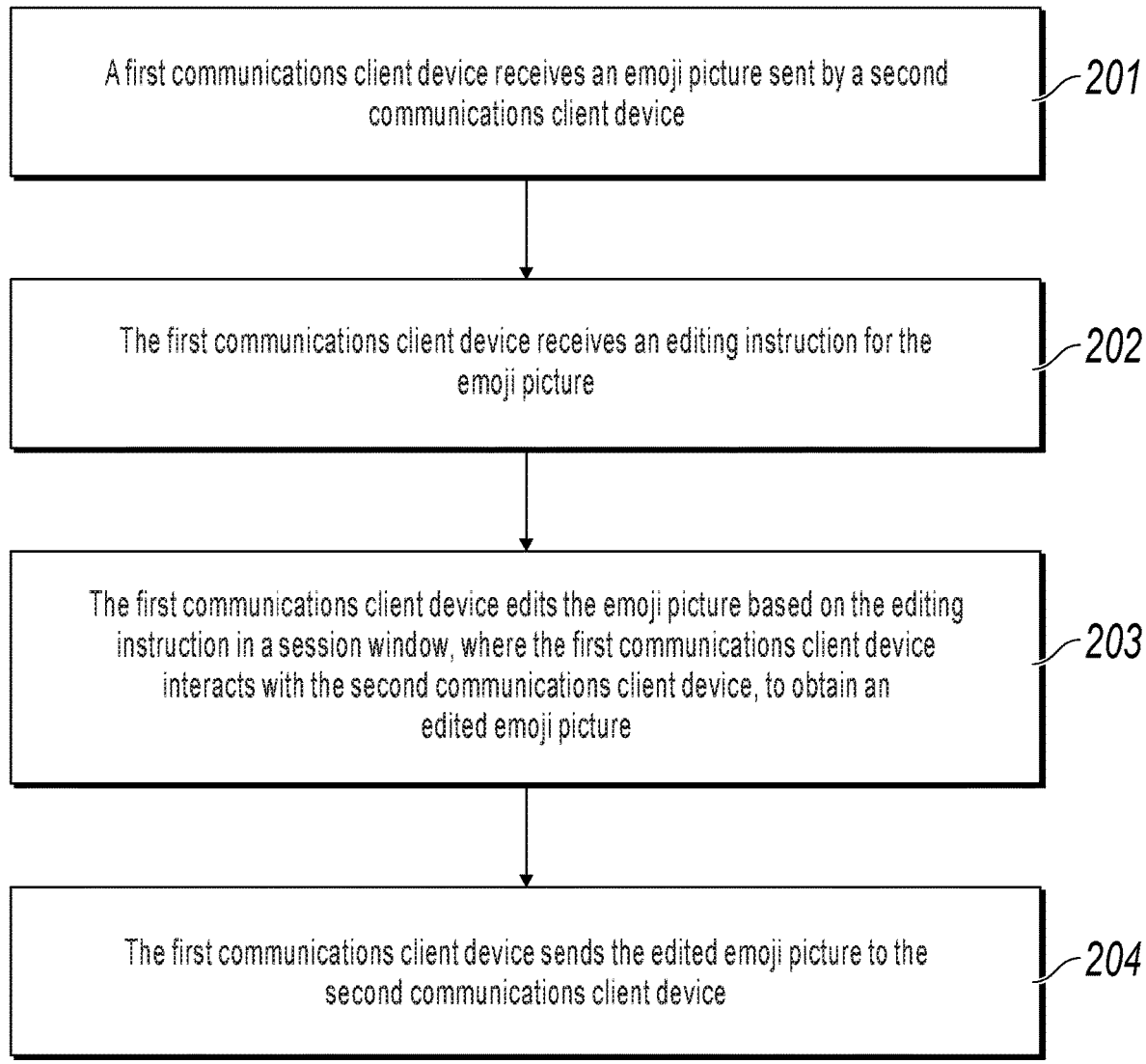
FIG. 2 is a schematic flowchart illustrating an instant-messaging-based emoji picture sending method according to an implementation of the present application.

FIG. 2 is a schematic flowchart illustrating an instant-messaging-based emoji picture sending method according to this implementation of the present application. The method is described below. This implementation of the present application can be performed by a first communications client device.

Step 201: The first communications client device receives an emoji picture sent by a second communications client device.

In step 201, a user who uses the first communications client device and a user who uses the second communications client device can send an emoji picture to each other when the users communicate with each other by using communications software.

In this implementation of the present application, after the second communications client device sends the emoji picture to the first communications client device, the first communications client device can receive the emoji picture sent by the second communications client device, and display the emoji picture in a session window where the first communications client device interacts with the second communications client device.

It is worthwhile to note that, in this implementation of the present application, there can be at least two application scenarios where the first communications client device receives the emoji picture sent by the second communications client device. In a first application scenario, the first communications client device performs one-to-one interaction with the second communications client device. In a second application scenario, the first communications client device and the second communications client device belong to the same group, and the first communications client device interacts with the second communications client device in the group.

If the first communications client device performs one-to-one interaction with the second communications client device, the session window can be a session window where the first communications client device performs one-to-one interaction with the second communications client device. If the first communications client device interacts with the second communications client device in the group, the session window can be a session window of the group.

Step 202: The first communications client device receives an editing instruction for the emoji picture.

In step 202, after receiving the emoji picture and displaying the emoji picture in the session window, the first communications client device can receive the editing instruction for the emoji picture, from the user who uses the first communications client device, so that the first communications client device edits the emoji picture.

In this implementation of the present application, the editing instruction can be used for editing the emoji picture, and specifically, can be an editing instruction for changing a specified pattern of the emoji picture.

Specifically, that the first communications client device receives an editing instruction for the emoji picture includes: when detecting a specified operation performed by a user on the emoji picture, displaying, by the first communications client device, editing options for editing the emoji picture in the session window, where the specified operation includes a tap/click operation, a double-tap/click operation, or a touch and hold operation; and receiving, by the first communications client device, the editing instruction for the emoji picture, where the editing instruction is obtained by the user by selecting one editing option.

In other words, the first communications client device can monitor in real time whether the user who uses the first communications client device performs the specified operation such as the tap/click operation, the double-tap/click operation, or the touch and hold operation on the emoji picture, and if the first communications client device detects the specified operation performed by the user on the emoji picture, the first communications client device can display the editing options for the emoji picture in the session window.

The editing options can be displayed at a floating layer in the session window, or can be displayed in a drop-down menu in the session window. It is not specifically limited. The editing options can include an option for editing the emoji picture. For example, the option can be performing inverse editing on the emoji picture, performing blurring editing on the emoji picture, performing deformation editing on the emoji picture, or performing rotation editing on the emoji picture.

Therefore, after viewing the editing options, the user who uses the first communications client device can select one option based on a need of the user.

After the user selects the option from the editing options, it can be considered that the user sends the editing instruction for the emoji picture to the first communications client device. The first communications client device can receive the editing instruction.

Step 203: The first communications client device edits the emoji picture based on the editing instruction in a session window, where the first communications client device interacts with the second communications client device, to obtain an edited emoji picture.

In step 203, after receiving the editing instruction, the first communications client device can edit the emoji picture in the session window based on the editing instruction, to obtain the edited emoji picture.

For example, if the editing instruction is an inverse editing instruction for the emoji picture, the first communications client device can perform inverse editing on the emoji picture based the editing instruction, and obtain an edited emoji picture. The edited emoji picture is the inverse of the emoji picture.

Step 204: The first communications client device sends the edited emoji picture to the second communications client device.

In step 204, after obtaining the edited emoji picture, the first communications client device can send the edited emoji picture to the second communications client device, to communicate with the second communications client device by using the picture.

In this implementation of the present application, based on the session window described in step 201, if the session window is the session window where the first communications client device performs one-to-one interaction with the second communications client device, the first communications client device can send the edited emoji picture to the second communications client device only. If the session window is the session window of the group, the first communications client device can send the edited emoji picture not only to the second communications client device but also to other communications clients in the group.

It is worthwhile to note that, when sending the edited emoji picture, the first communications client device can directly send the edited emoji picture without performing another redundant operation. For example, after obtaining the inverse emoji picture, the first communications client device can directly send the inverse emoji picture, and display the inverse emoji picture in the session window, and the user does not need to download the unedited emoji picture or determine whether to send the edited emoji picture. Therefore, user operations can be simplified, and it is relatively convenient to send the edited emoji picture.

In another implementation of the present application, after obtaining the edited emoji picture, the first communications client device can display the edited emoji picture in the session window, so that the user who uses the first communications client device previews the edited emoji picture, and determines, based on the previewed edited emoji picture, whether to send the edited emoji picture.

Therefore, if the edited emoji picture satisfies a need of the user, the user can determine to send the edited emoji picture. The first communications client device can send the edited emoji picture to the second communications client device. If the edited emoji picture does not satisfy the need of the user, the user can determine not to send the edited emoji picture. The first communications client device can cancel sending of the edited emoji picture to the second communications client device. As such, the user determines whether to send the edited emoji picture to further improve user experience.

In addition, when displaying the edited emoji picture in the session window, the first communications client device can further allow the user who uses the first communications client device to set an attribute of the edited emoji picture, for example, the user can set a color, a size, or an editing degree of the edited emoji picture.

After the user sets the attribute of the edited emoji picture, the user can determine whether to send the specified emoji picture, and the first communications client device can determine, based on the choice of the user, whether to send the specified emoji picture.

The user can set the edited emoji picture, so that the first communications client device can send the specified emoji picture. Therefore, there can be diverse emoji picture sending methods, so as to further improve user experience.

In actual application, it can be determined, based on an actual situation, whether the user is allowed to preview the edited emoji picture. It is not specifically limited in this implementation of the present application. If the user is allowed to preview the edited emoji picture, it can be further determined, based on an actual situation, whether the user is allowed to set the attribute of the edited emoji picture. It is not specifically limited in this implementation of the present application either.

It is worthwhile to note that, in an actual application scenario, the edited emoji picture can be a response to the received emoji picture. After viewing the emoji picture, the user who uses the first communications client device can use the edited emoji picture to respond to the user who uses the second communications client device. Based on the technical solution provided in this implementation of the present application, interaction between users can be increased by using emoji pictures and can bring more fun.

In the technical solution provided in this implementation of the present application, when sending an emoji picture, a user can edit a received emoji picture in the session window, and then send an edited emoji picture. Because the user can edit and then send the emoji picture, compared with the existing technology, there can be diverse emoji picture sending methods, so as to effectively improve user experience.

In addition, because the user can send a received emoji picture without downloading the emoji picture, user operations can be simplified, and it is more convenient for the user to send the emoji picture.

Implementation 2

FIG. 3 to FIG. 6 are schematic diagrams illustrating an instant-messaging-based emoji picture sending method according to this implementation of the present application. The schematic diagrams illustrating the picture sending method described in FIG. 3 to FIG. 6 can be implemented by using the picture sending method described in the implementation shown in FIG. 2.

In an application scenario of this implementation of the present application, user A sends an emoji picture to user B, and user B sends an emoji picture to user A based on the received emoji picture. Specifically:

Step 1: The user B receives an emoji picture a sent by user A.

Figure 3:
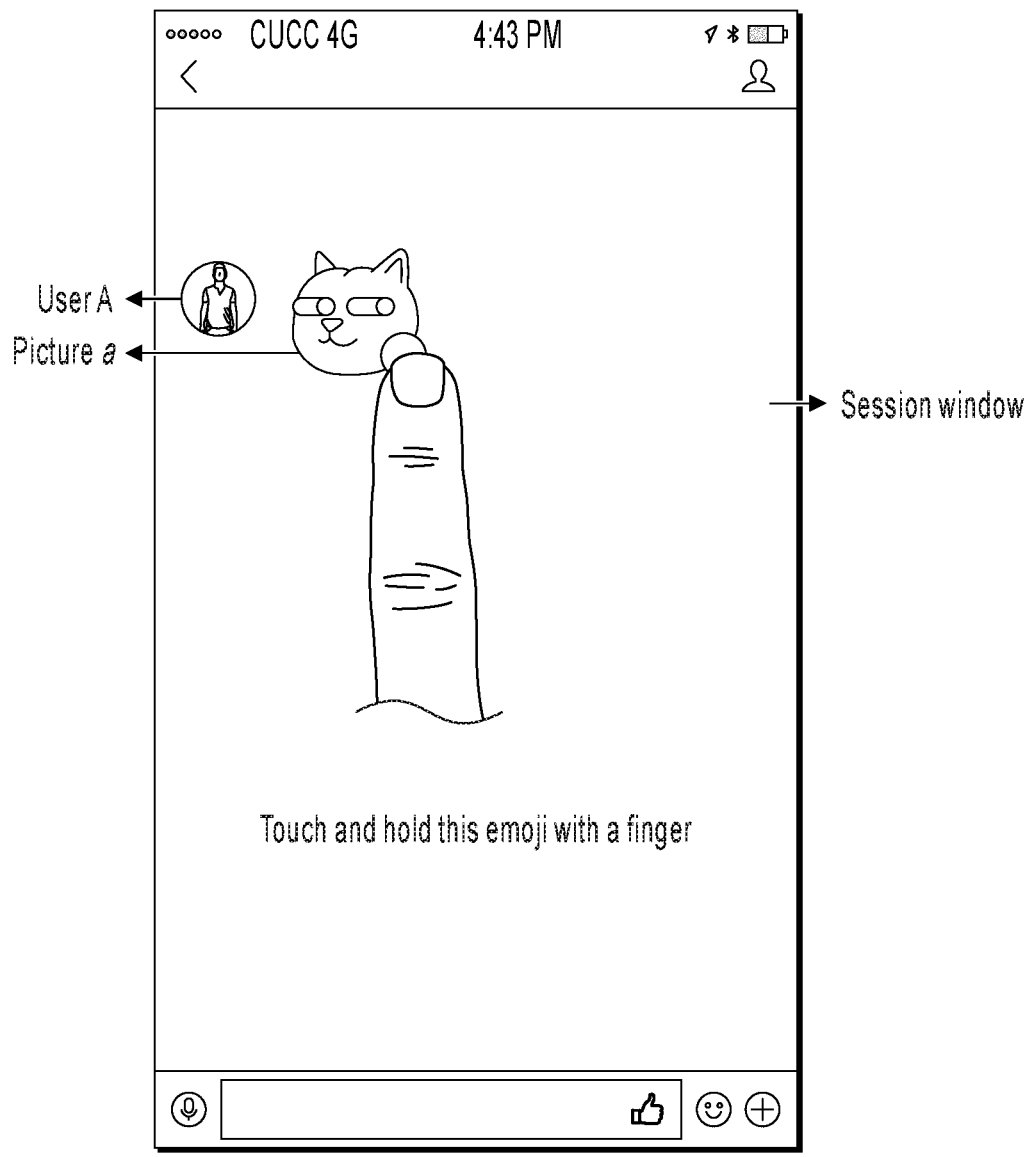
FIG. 3 is a schematic diagram illustrating an instant-messaging-based emoji picture sending method according to an implementation of the present application.

As shown in FIG. 3, user A can send the emoji picture a to user B by using communications software, and user B can receive the emoji picture a by using a communications software client, and display the emoji picture a in a session window for user B.

Step 2: When user B wants to send an emoji picture to user A, user B can perform a specified operation on the received emoji picture a.

As shown in FIG. 3, the user can touch and hold the emoji picture a. The communications software client used by user B can display editing options for the emoji picture a in the session window based on the touch and hold operation of user B, and the displayed editing options are shown in FIG. 4.

Figure 4:
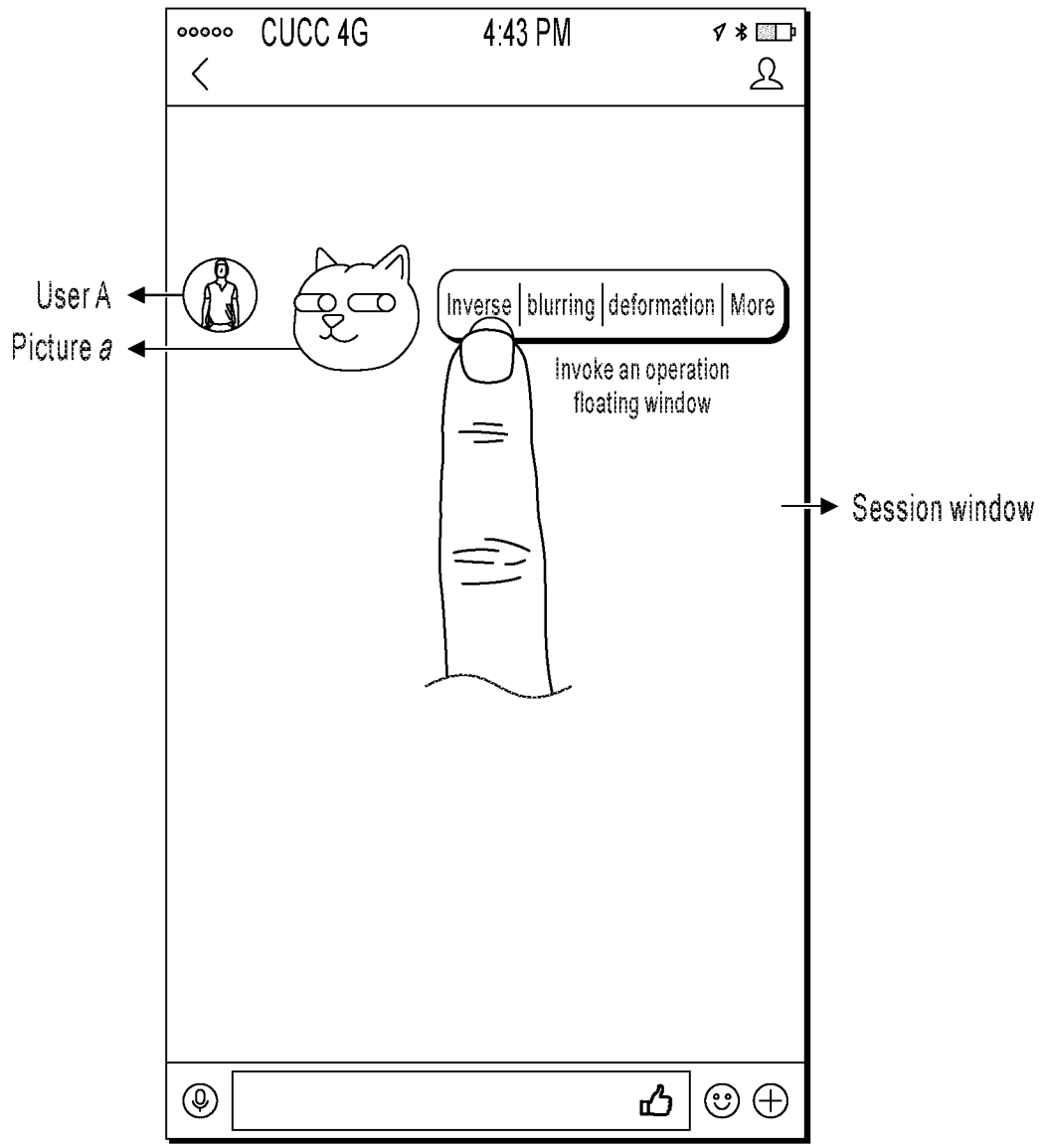
FIG. 4 is a schematic diagram illustrating an instant-messaging-based emoji picture sending method according to an implementation of the present application.

In FIG. 4, the editing options for the emoji picture a can be displayed at a floating layer, and the editing options can include inverse, blurring, and deformation. The user B can select one option based on a need of user B. For example, if user B wants to send an emoji picture that is the inverse of the emoji picture a, user B can select the "inverse" editing option.

Step 3: A communications software client used by user B edits the emoji picture a based on an editing option selected by user B, and sends an edited emoji picture to a communications software client used by user A.

After user B chooses to perform "inverse" editing on the emoji picture a, the communications software client used by user B can perform inverse editing on the emoji picture a based on the choice of user B, to obtain an emoji picture a1, and the emoji picture a1 is the inverse of the emoji picture a.

Figure 5:
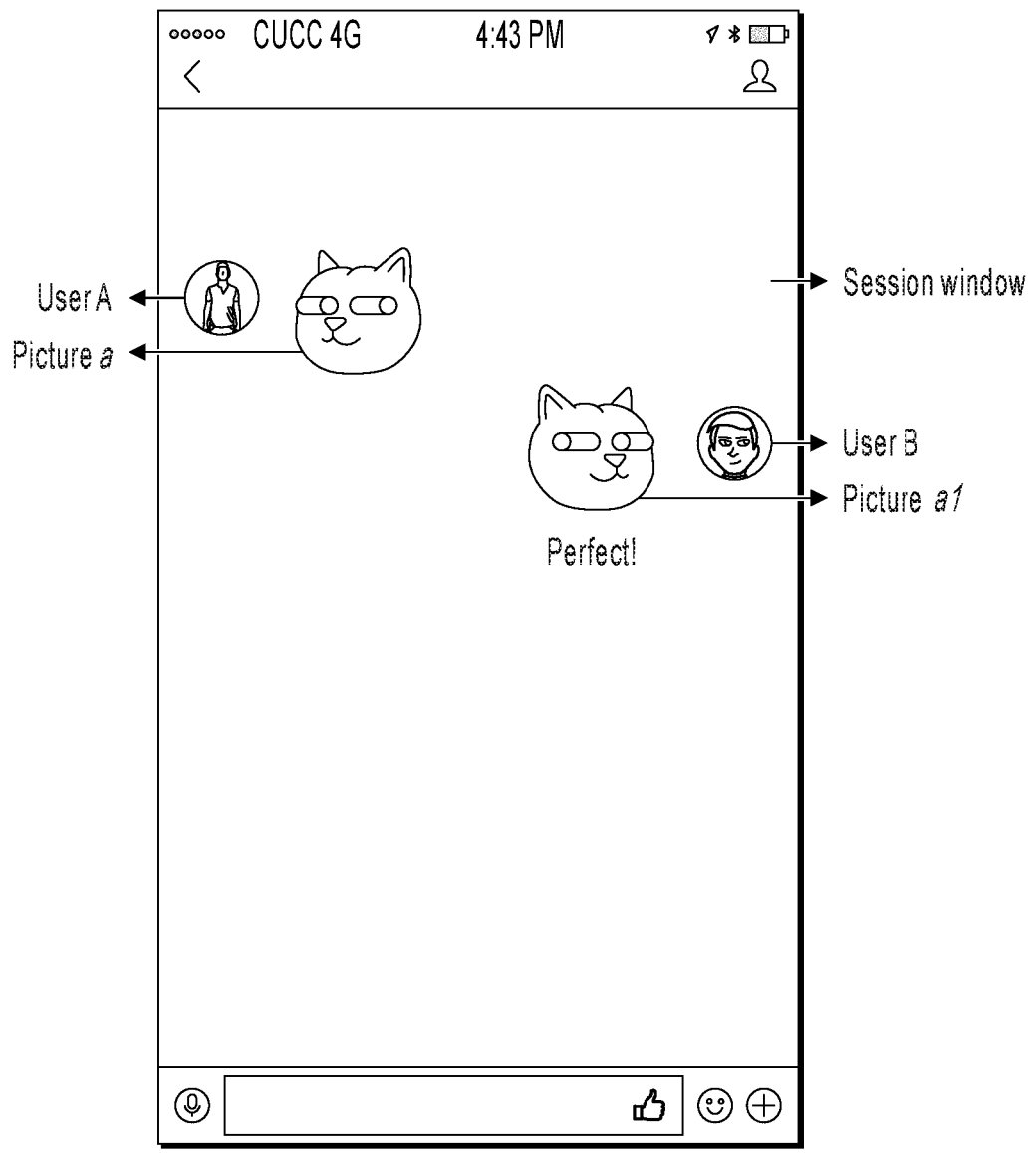
FIG. 5 is a schematic diagram illustrating an instant-messaging-based emoji picture sending method according to an implementation of the present application.

After obtaining the emoji picture a1, the communications software client used by user B can directly send the emoji picture a1 to the communications software client used by user A, and display the emoji picture a1 in the session window for user B, as shown in FIG. 5.

In an actual application scenario, a "dog head" in the emoji picture a1 sent by user B looks at a profile picture of user A. An object (user A) "despised" by the "dog head" in the emoji picture a1 is consistent with user A that the "dog head" looks at. Therefore, user B can vividly express "contempt" for user A by using the emoji picture a1, to respond to user A.

In addition, if user B selects the "blurring" editing option for the emoji picture in step 2, the communications software client used by the user can perform blurring editing on the emoji picture a based on the choice of user B, to obtain an emoji picture a2, and the emoji picture a2 is a blurred picture of the emoji picture a (a blurring degree of the emoji picture a2 can be a default blurring degree).

Figure 6:
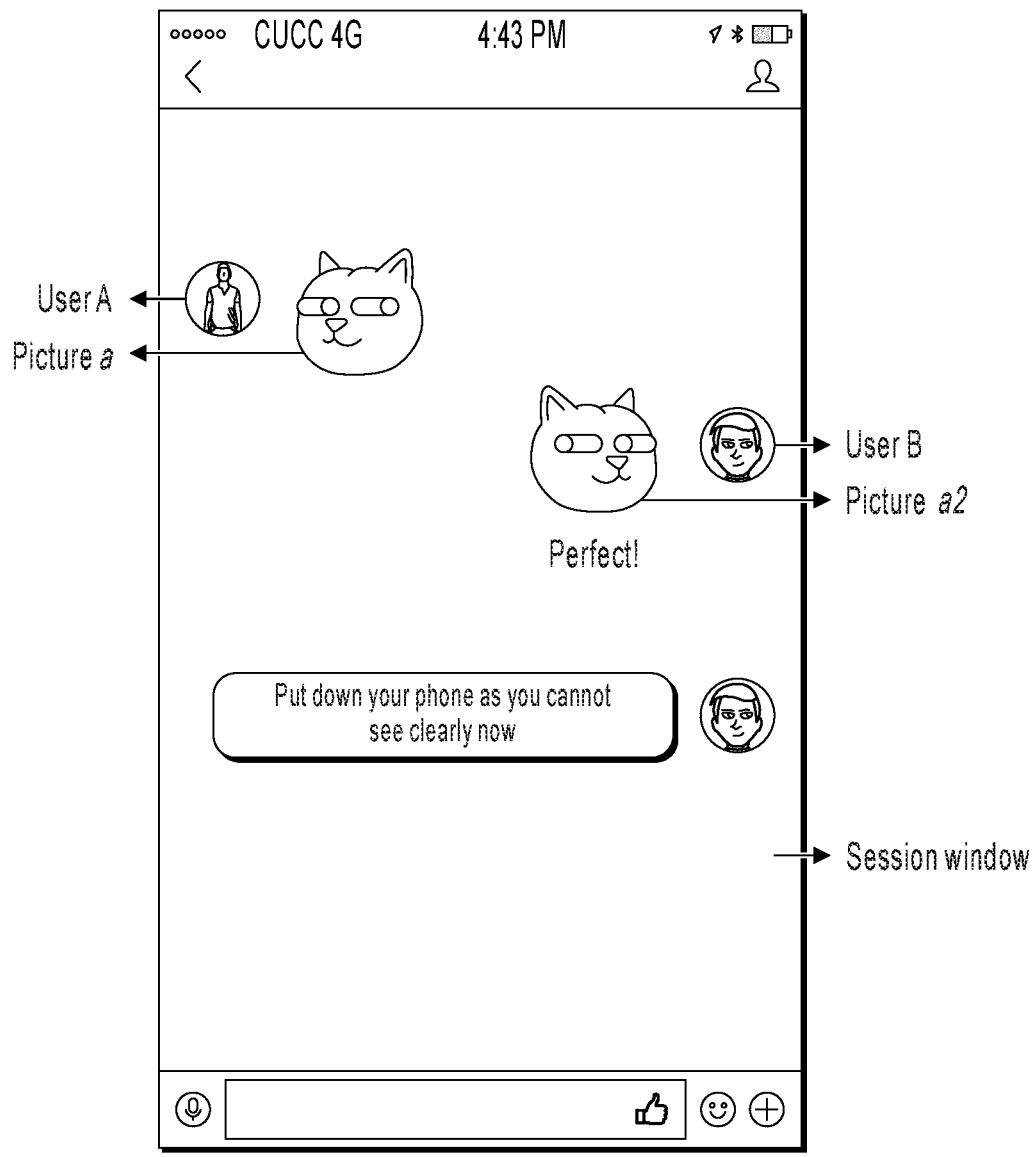
FIG. 6 is a schematic diagram illustrating an instant-messaging-based emoji picture sending method according to an implementation of the present application.

After obtaining the emoji picture a2, the communications software client used by user B can directly send the emoji picture a2 to the communications software client used by user A, and display the emoji picture a2 in the session window for user B, as shown in FIG. 6. In an actual application scenario, user B can more effectively remind user A to put down a mobile phone by using the emoji picture a2.

It can be seen from FIG. 3 to FIG. 6 that, after receiving an emoji picture sent by user A, if user B wants to send the received emoji picture to user A, user B can send the emoji picture without downloading the emoji picture. Compared with the existing technology, where a user needs to download an emoji picture before sending the emoji picture, operations of user B can be simplified. In addition, user B can further edit the emoji picture based on a need of user B, and send an edited emoji picture to user A, so as to diversify emoji picture sending methods, and effectively improve user experience of user B.

It is worthwhile to note that, in an existing-technology example where user A communicates with user B by using communications software, after receiving an emoji picture sent by user B, user A can touch and hold the emoji picture to pop up a shortcut menu, and can select an operation for the emoji picture from the pop-up menu option, such as saving, deleting, or forwarding. If user A wants to send the emoji picture to user B, user A can forward the emoji picture to user B.

However, when user A forwards the emoji picture to user B, if user A has not downloaded the emoji picture, user A can send the emoji picture to user B only after downloading the emoji picture, and consequently operation steps of user A are relatively tedious. If user A has downloaded the emoji picture, user A can send the emoji picture only based on a specified pattern of the emoji picture. When the user needs to send the emoji picture in another pattern, it is obvious that the existing technology cannot satisfy the need of user A, and consequently user experience is poor.

In this implementation of the present application, when receiving the emoji picture sent by user B, user A can touch and hold the emoji picture, etc. to pop up the editing options, and edit the emoji picture based on the editing options. After obtaining the edited emoji picture, user A can directly send the edited emoji picture to user B without another redundant operation. As such, not only user operations can be simplified because the emoji picture does not need to be downloaded, but also there can be diverse emoji picture sending methods.

Implementation 3

Figure 7:
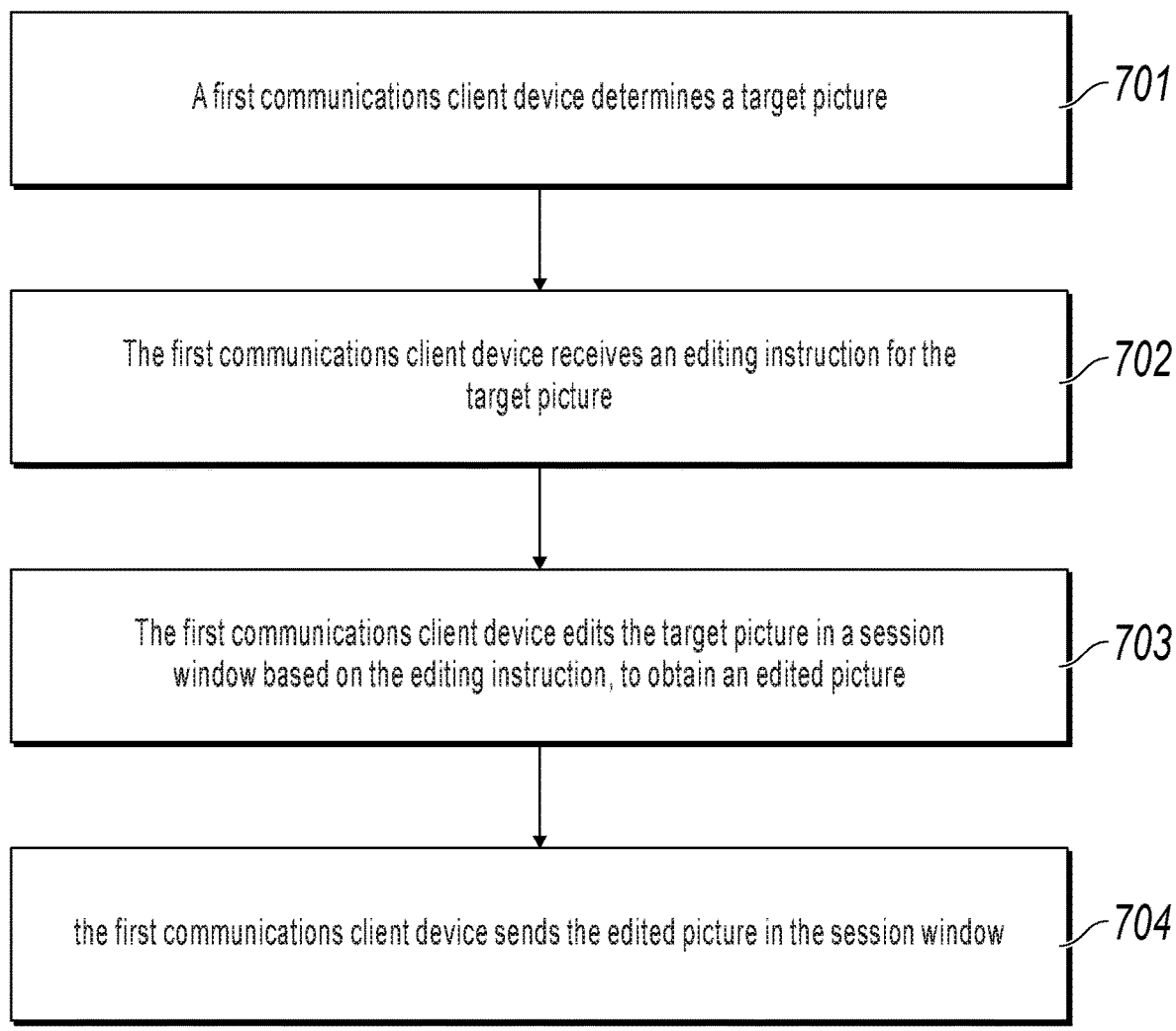
FIG. 7 is a schematic flowchart illustrating an instant-messaging-based picture sending method according to an implementation of the present application.

FIG. 7 is a schematic flowchart illustrating an instant-messaging-based picture sending method according to this implementation of the present application. The method is described below. This implementation of the present application can be performed by a first communications client device.

It is worthwhile to note that, the instant-messaging-based picture sending method provided in this implementation of the present application is different from the picture sending methods in the implementations described in FIG. 2 and FIG. 3 to FIG. 6 in terms of application scenario. Application scenarios of this implementation of the present disclosure include the application scenarios of the implementations described in FIG. 2 and FIG. 3 to FIG. 6.

Pictures sent by using the instant-messaging-based picture sending method provided in this implementation of the present application include but are not limited to emoji pictures. Sending an emoji picture can be used as an example for describing this implementation of the present application.

Step 701: The first communications client device determines a target picture.

In step 701, a user can use the first communications client device to communicate with another user by using communications software. During the communication, if the user wants to send a picture to the other user, the first communications client device can determine the target picture.

In this implementation of the present application, the first communications client device can determine the target picture by using at least the following three methods:

Method 1: The first communications client device receives a picture sent by a second communications client device, and determines the picture sent by the second communications client device as the target picture.

Specifically, when the user who uses the first communications client device communicates with a user who uses the second communications client device by using communications software, the second communications client device can send a picture to the first communications client device, and the first communications client device can receive the picture sent by the second communications client device. The first communications client device can display the received picture in a session window, where the first communications client device interacts with the second communications client device, and use the received picture as the target picture.

Method 2: The first communications client device determines a picture that has been sent to a second communications client device, and determines the sent picture as the target picture.

Specifically, when the user who uses the first communications client device communicates with a user who uses the second communications client device by using communications software, the first communications client device can send a picture to the second communications client device, and use the sent picture as the target picture after sending the picture and displaying the picture in a session window.

Method 3: The first communications client device determines a picture included in a picture library, and determines the picture as the target picture.

Specifically, when the user who uses the first communications client device communicates with a user who uses a second communications client device by using communications software, when the user who uses the first communications client device wants to send a picture, the first communications client device can display a picture library, and use a picture included in the picture library as the target picture.

It is worthwhile to note that, in an actual application scenario for Method 1, after receiving a picture sent by the user who uses the second communications client device, the user who uses the first communications client device wants to send the received picture to the user who uses the second communications client device.

In an actual application scenario for Method 2, after sending a picture to the user who uses the second communications client device, the user who uses the first communications client device wants to send the sent picture again to the user who uses the second communications client device.

In an actual application scenario for Method 3, the user who uses the first communications client device wants to select a picture from the picture library, and send the picture to the user who uses the second communications client device.

In this implementation of the present application, for the previous three application scenarios, the session window can be a session window where the first communications client device interacts with the second communications client device (the first communications client device performs one-to-one interaction with the second communications client device), or a session window where the first communications client device interacts with the second communications client device and other communications clients (the session window is a session window of a group, and the first communications client device and the second communications client device belong to the group). It is not specifically limited.

The first communications client device can perform step 202 after determining the target picture.

Step 702: The first communications client device receives an editing instruction for the target picture.

In step 702, after determining the target picture, the first communications client device can receive the editing instruction, for the target picture, from the user who uses the first communications client device, so that the first communications client device edits the target picture.

In this implementation of the present application, the editing instruction can be used for editing the target picture. Specifically, the editing instruction can be an editing instruction for changing a specified pattern of the target picture, for example, a mirroring editing instruction for the target picture, a blurring editing instruction for the target picture, a deformation editing instruction for the target picture, or a rotation instruction for the target picture. It is not specifically limited in this implementation of the present application.

That the first communications client device receives an editing instruction for the target picture can include: monitoring, by the first communications client device, an operation performed by a user on the target picture, where the user is a user who uses the first communications client device; when detecting that the user performs a specified operation on the target picture, displaying, by the first communications client device, editing options for editing the target picture in the session window; and receiving, by the first communications client device, the editing instruction for the target picture from the user, where the editing instruction is obtained by the user by selecting one editing option.

In other words, after determining the target picture, the first communications client device can monitor in real time whether the user who uses the first communications client device performs the specified operation on the target picture, and if the first communications client device detects that the user performs the specified operation on the picture, the first communications client device can display, based on the specified operation, the editing options for editing the target picture in the session window.

The specified operation can be a tap/click operation for the target picture, a double-tap/click operation for the target picture, a touch and hold operation for the target picture, etc.

The editing options can include an option for editing the target picture. For example, the option can be performing inverse editing on the target picture, performing blurring editing on the target picture, performing deformation editing on the target picture, or performing rotation editing on the target picture.

The editing options can be displayed at a floating layer in the session window, or can be displayed in a drop-down menu in the session window. Specifically, the editing options can be displayed on the upper right of the target picture, or displayed on the lower right of the target picture, provided that the location is convenient for the user to select an option included in the editing options.

After the first communications client device displays the editing options, the user who uses the first communications client device can view the editing options. The user can select one option based on a need of the user.

After the user selects the option from the editing options, it can be considered that the user sends the editing instruction for the target picture to the first communications client device. The first communications client device can receive the editing instruction.

The first communications client device can perform step 703 after receiving the editing instruction for the target picture in the method described above.

Step 703: The first communications client device edits the picture in a session window based on the editing instruction, to obtain an edited picture.

In step 703, after receiving the editing instruction, the first communications client device can edit the target picture based on the editing instruction in the session window, where the first communications client device interacts with the second communications client device, to obtain the edited picture.

Step 704: The first communications client device sends the edited picture in the session window.

In step 704, after obtaining the edited picture, the first communications client device can directly send the edited picture to the second communications client device, to communicate with the second communications client device by using the picture.

When sending the target picture to the user who uses the second communications client device, the user who uses the first communications client device can edit the target picture, and send the edited picture. Therefore, there can be diverse picture sending methods, and a need of the user for sending a picture can be satisfied, so as to effectively improve user experience.

In another implementation provided in the present application, after the first communications client device obtains the edited picture and before the first communications client device sends the edited picture, the method further includes: displaying the edited picture, so that the user previews the edited picture.

In this implementation of the present application, after obtaining the edited picture, the first communications client device can display the edited picture at the first communications client device, so that the user who uses the first communications client device can preview the edited picture.

In addition, when displaying the edited picture, the first communications client device can further display a button used by the user to determine whether to send the edited picture. The user can determine, based on a preview result, whether to send the edited picture, and when determining to send the edited picture, send an acknowledgment instruction to the first communications client device by using the button. The first communications client device can receive the acknowledgment instruction, and send the edited picture to the second communications client device based on the acknowledgment instruction.

Because the user determines whether to send the edited picture, a picture that does not satisfy a need of the user can be prevented from being sent, and user experience can be improved.

In another implementation of the present application, when the first communications client device displays the edited picture, the method further includes: displaying a setting option to the user, where the setting option is used by the user to set an attribute of the edited picture; receiving a setting instruction sent by the user, where the setting instruction is obtained by the user by selecting the setting option; and setting the edited picture in the session window based on the setting instruction, to obtain a specified picture.

In this implementation of the present application, when displaying the edited picture, the first communications client device can further display the setting option for the edited picture. The setting option can include an option for setting the attribute of the edited picture. The setting option can include setting a color, a size, an editing degree of the edited picture.

For example, if the editing instruction received by the first communications client device is a blurring operation instruction for the target picture, after the first communications client device obtains a blurred picture (the target picture can be processed based on a default blurring degree), the setting option can include a blurring degree option. The setting option can be used for setting a blurring degree of the blurred picture.

In addition, the setting option can further include an option for setting a color of the blurred picture, so that the user can set both the blurring degree and the color of the blurred picture.

After the user makes a choice based on the setting option, it can be considered that the user sends the setting instruction for the edited picture to the first communications client device. The first communications client device can receive the setting instruction, and set the edited picture based on the setting instruction, to obtain the specified picture.

That the first communications client device sends the specified picture to the second communications client device after obtaining the specified picture includes: receiving, by the first communications client device, an acknowledgment instruction sent by the user, where the acknowledgment instruction is sent by the user after the user previews the edited picture; and sending, by the first communications client device, the edited picture in the session window based on the acknowledgment instruction.

In this implementation of the present application, when the first communications client device sets the edited picture based on the setting instruction, the first communications client device can display the specified picture to the user in real time, so that the user can preview the specified picture in real time, and determine, based on the previewed picture, whether to send the picture to the second communications client device.

After determining, based on a preview result, to send the picture to the second communications client device, the user can send the acknowledgment instruction to the first communications client device by using the button described above. The first communications client device can receive the acknowledgment instruction, and send the specified picture in the session window based on the acknowledgment instruction.

Specifically, if the session window is the session window where the first communications client device performs one-to-one interaction with the second communications client device, the first communications client device can send the specified picture to the second communications client device. If the session window is the session window of the group including the first communications client device and the second communications client device, the first communications client device sends the specified picture not only to the second communications client device but also to other communications clients in the group.

Because the user can set the edited emoji picture, there can be diverse emoji picture sending methods, and user experience is further improved.

In the technical solution provided in this implementation of the present application, when sending an emoji picture, the user can edit, in the session window, the emoji picture that needs to be sent, and send an edited emoji picture to another user. Compared with the existing technology, there can be diverse emoji picture sending methods, so as to effectively improve user experience.

Implementation 4

Figure 8:
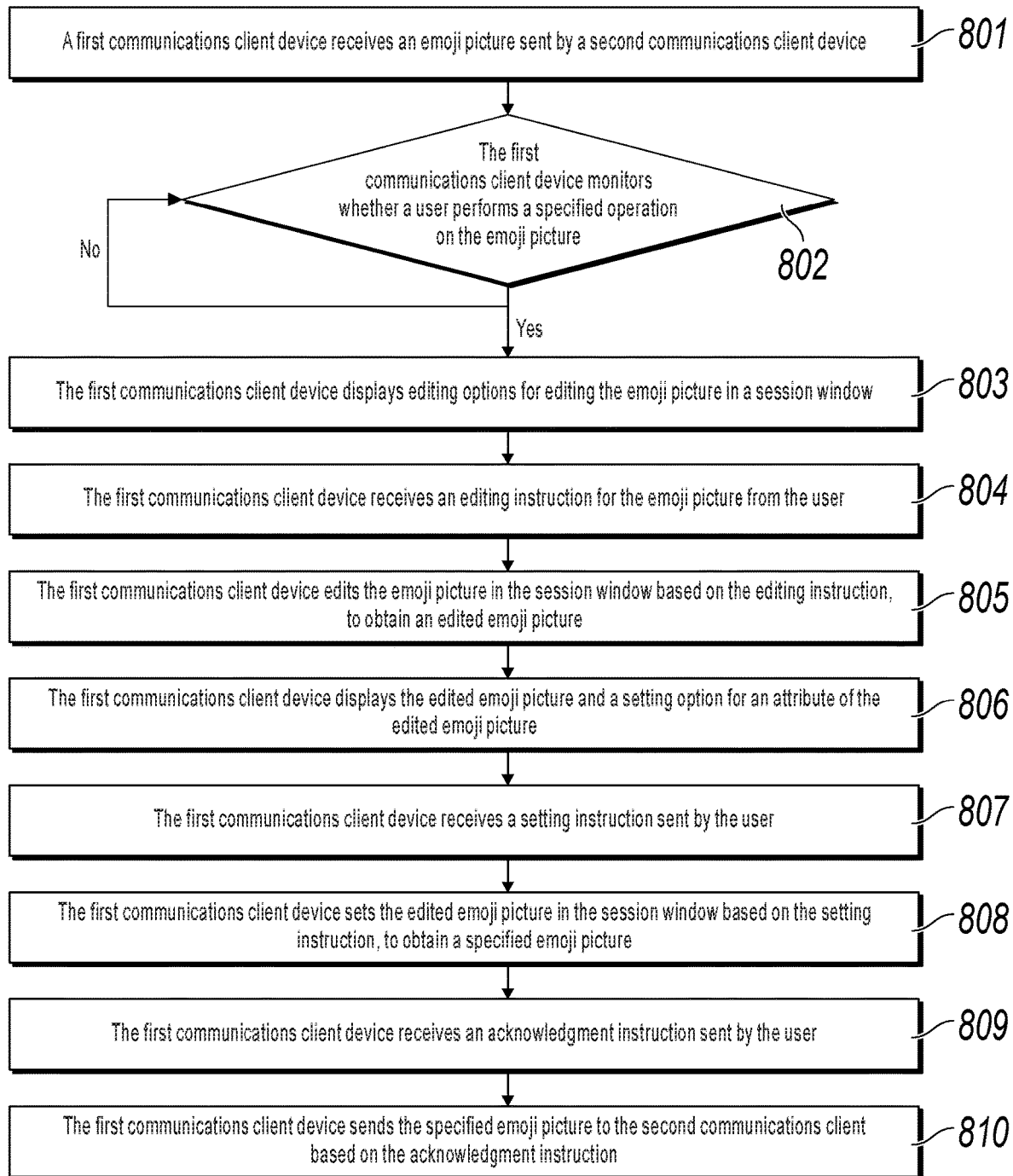
FIG. 8 is a schematic flowchart illustrating another instant-messaging-based picture sending method according to an implementation of the present application.

FIG. 8 is a schematic flowchart illustrating another instant-messaging-based picture sending method according to this implementation of the present application. The method is described below. This implementation of the present application can be performed by a first communications client device. The picture sent by using the picture sending method provided in this implementation of the present application is an emoji picture.

It is worthwhile to note that, an application scenario of this implementation of the present application can be the application scenario corresponding to Method 1 in step 701 in the implementation described in FIG. 7. After receiving an emoji picture sent by a user who uses a second communications client device, a user who uses the first communications client device wants to send, in response, the received emoji picture to the user who uses the second communications client device.

The picture sending method provided in this implementation of the present application specifically includes steps below.

Step 801: The first communications client device receives an emoji picture sent by a second communications client device.

After receiving the emoji picture, the first communications client device can display the emoji picture in a session window. The session window is a session window where the first communications client device interacts with the second communications client device.

Step 802: The first communications client device monitors whether a user performs a specified operation on the emoji picture.

In step 802, the specified operation can be a tap/click operation for the emoji picture, a double-tap/click operation for the emoji picture, a touch and hold operation for the emoji picture, etc.

If the first communications client device detects that an operation performed by the user on the emoji picture is the specified operation, the first communications client device can perform step 803; otherwise, the first communications client device can cyclically perform step 802.

Step 803: The first communications client device displays editing options for editing the emoji picture in a session window.

The editing options can be displayed at a floating layer in the session window. The editing options can include an option for editing the emoji picture. For example, the option can be performing inverse editing on the emoji picture, performing blurring editing on the emoji picture, performing deformation editing on the emoji picture, or performing rotation editing on the emoji picture.

Step 804: The first communications client device receives an editing instruction for the emoji picture from the user.

The editing instruction is obtained by the user selecting one editing option.

Step 805: The first communications client device edits the emoji picture in the session window based on the editing instruction, to obtain an edited emoji picture.

Step 806: The first communications client device displays the edited emoji picture and a setting option for an attribute of the edited emoji picture.

The setting option can be used by the user to set the attribute of the edited emoji picture. The setting option can include an option for setting the attribute of the edited emoji picture.

Step 807: The first communications client device receives a setting instruction sent by the user.

The setting instruction can be obtained by the user by selecting the setting option.

Step 808: The first communications client device sets the edited emoji picture in the session window based on the setting instruction, to obtain a specified emoji picture.

In step 808, after obtaining the specified emoji picture, the first communications client device can display the specified emoji picture to the user, so that the user previews the specified emoji picture.

Step 809: The first communications client device receives an acknowledgment instruction sent by the user.

The acknowledgment instruction is sent by the user after the user previews the specified emoji picture.

Step 810: The first communications client device sends the specified emoji picture to the second communications client device based on the acknowledgment instruction.

In the picture sending method provided in this implementation of the present application, after receiving an emoji picture sent by the user who uses the second communications client device, if the user who uses the first communications client device wants to send the received emoji picture to the user who uses the second communications client device, the user who uses the first communications client device can edit the emoji picture, and the first communications client device sends an edited emoji picture to the second communications client device. Therefore, the user who uses the first communications client device can send the emoji picture without downloading the emoji picture. In addition, the user edits the emoji picture, and sends the edited emoji picture, so that there can be diverse emoji picture sending methods, and user experience can be effectively improved.

Implementation 5

Figure 9:
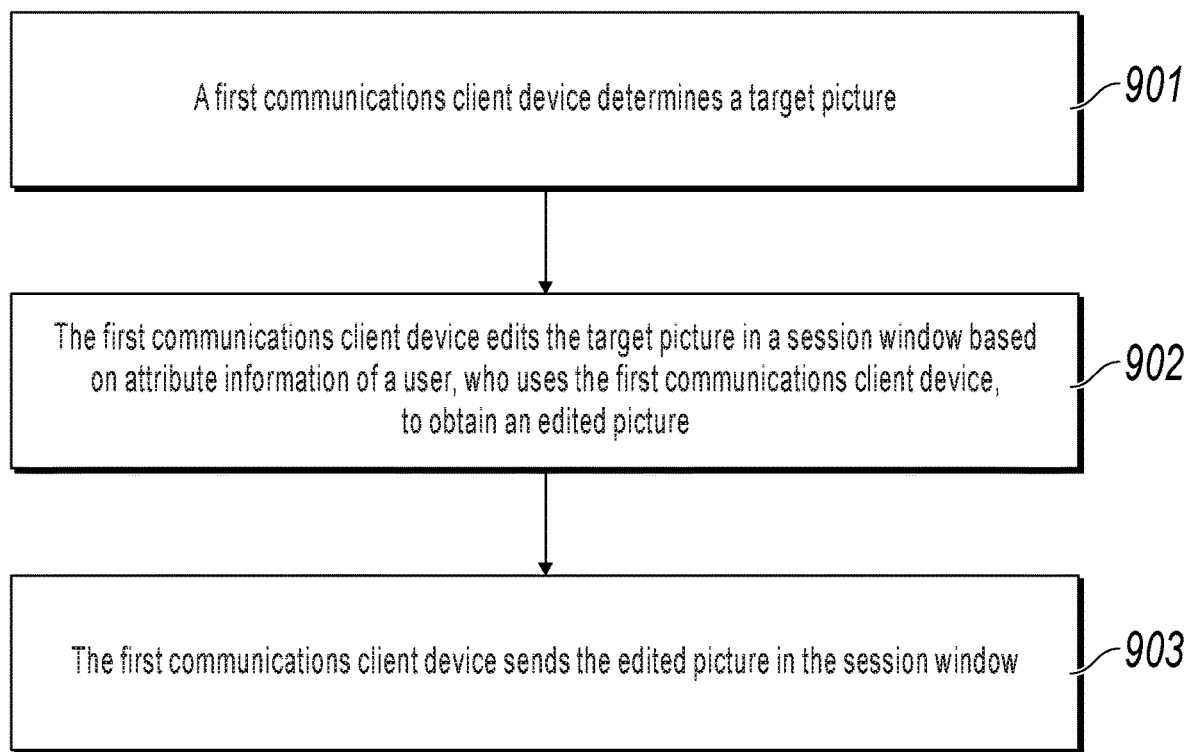
FIG. 9 is a schematic flowchart illustrating still another instant-messaging-based picture sending method according to an implementation of the present application.

FIG. 9 is a schematic flowchart illustrating another instant-messaging-based picture sending method according to this implementation of the present application. The method is described below. This implementation of the present application can be performed by a first communications client device.

Step 901: The first communications client device determines a target picture.

In step 901, a user can use the first communications client device to communicate with another user by using communications software. During the communication, if the user wants to send a picture to the other user, the first communications client device can determine the target picture.

In this implementation of the present application, the target picture includes an emoji picture. The first communications client device can determine the target picture by using the content described in step 701 in the implementation shown in FIG. 7. Details are not described here again.

Step 902: The first communications client device edits the target picture in a session window based on attribute information of a user, who uses the first communications client device, to obtain an edited picture.

The session window is a session window where the first communications client device interacts with another communications client, or a session window where the first communications client device interacts with other communications clients.

In step 902, after determining the target picture and before sending the target picture, the first communications client device can determine the attribute information of the user who uses the first communications client device.

In this implementation of the present application, the attribute information of the user who uses the first communications client device includes: location information of the user in the session window (for example, in FIG. 5, location information of user B is that user B is on a right side of the session window), chat content between the user and another user, mood of the user (which can be determined by the chat content of the user), etc.

After determining the attribute information of the user, the first communications client device can automatically edit the target picture based on the attribute information in the session window, to obtain the edited picture. Therefore, the user can obtain the edited picture without triggering an editing operation for the target picture.

FIG. 5 is used as an example. The user B corresponds to the first communications client device. After determining that the target picture is a picture a, and before sending the picture a to user A, the first communications client device can automatically edit the picture a based on the location information of user B (on the right side of the session window). A looking direction of a "dog head" in an edited picture a1 changes from right to left, so as to express "contempt" of user B for user A by using the picture a1. The first communications client device can automatically edit the picture a to obtain the picture a1, based on the location information of user B without triggering an editing operation for the picture a from user B, so that not only there can be diverse picture sending methods, but operations of user B are effectively simplified.

Step 903: The first communications client device sends the edited picture in the session window.

In step 903, after obtaining the edited picture, the first communications client device can send the edited picture in the session window.

In another implementation provided in the present application, before sending the edited picture, the first communications client device can display the edited picture to the user who uses the first communications client device, so that the user previews the edited picture. In addition, after the user previews the edited picture, the first communications client device can further allow the user to set attribute information of the edited picture. A specific method can be the same as the method described in step 704 in the implementation shown in FIG. 7, and details are not described here again.

In the technical solution provided in this implementation of the present application, after determining the target picture and before sending the target picture, the first communications client device can automatically edit the target picture based on the attribute information of the user who uses the first communications client device, and send the edited picture. Because the first communications client device can automatically edit the target picture based on the attribute information of the user, and then send the edited picture, there can be diverse target-picture sending methods, and user experience can be effectively improved. In addition, because the first communications client device can automatically edit the target picture based on the attribute information of the user without triggering an editing operation for the target picture from the user, user operations can be effectively simplified.

Implementation 6

Figure 10:
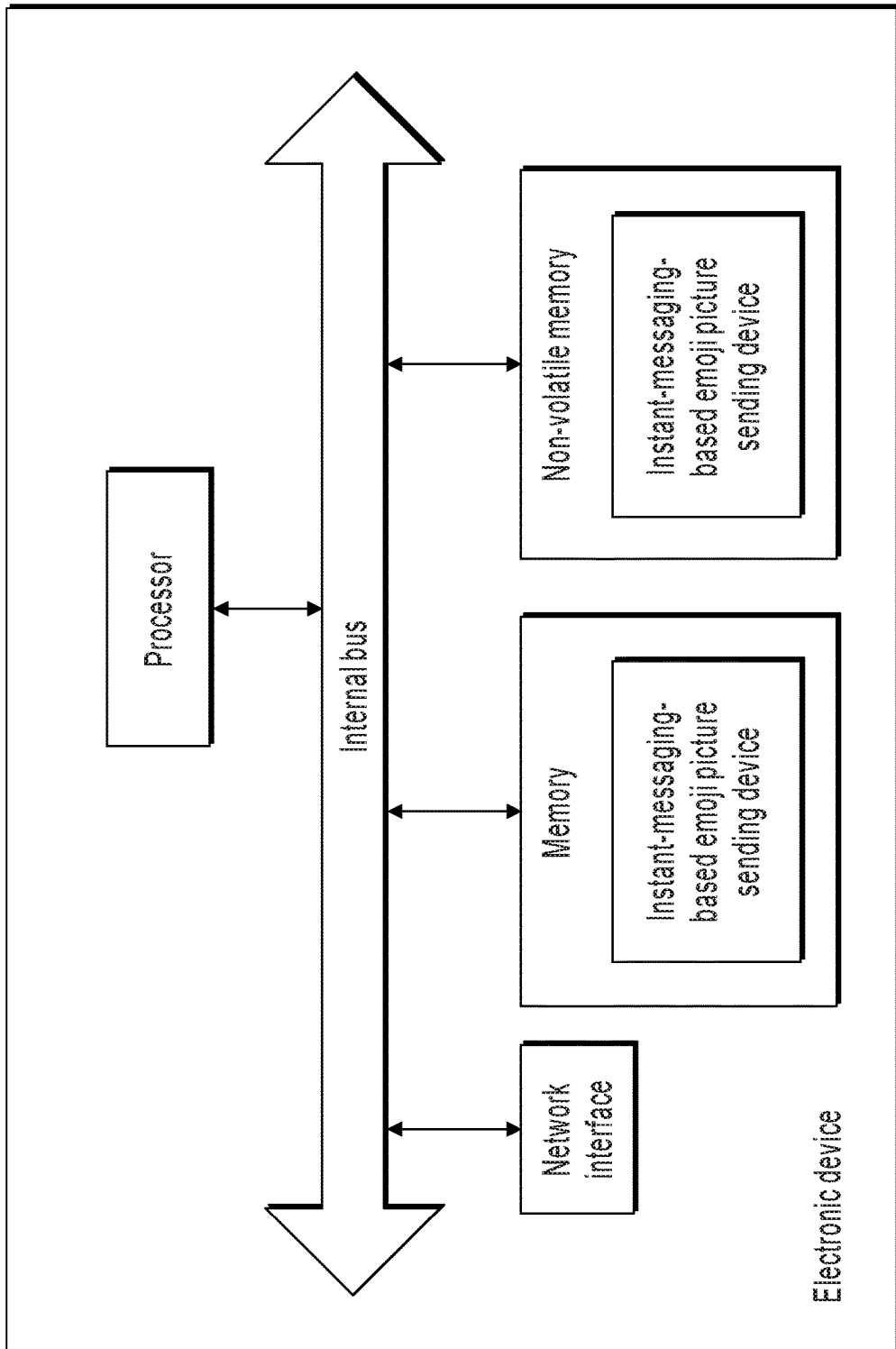
FIG. 10 is a schematic structural diagram illustrating an electronic device according to an implementation of the present application.

FIG. 10 is a schematic structural diagram illustrating an electronic device according to this implementation of the present application. As shown in FIG. 10, in terms of hardware, the electronic device includes a processor, an internal bus, a network interface, a memory, a non-volatile memory, and certainly can further include hardware needed by other services. The processor reads a corresponding computer program from the non-volatile memory and then runs the program in the memory, to logically form an instant-messaging-based emoji picture sending device. In addition to a software implementation, the present application does not exclude another implementation, for example, a logic device or a combination of software and hardware. In other words, an entity for executing the following processing procedure is not limited to logical units, and can be hardware or a logical component.

Figure 11:
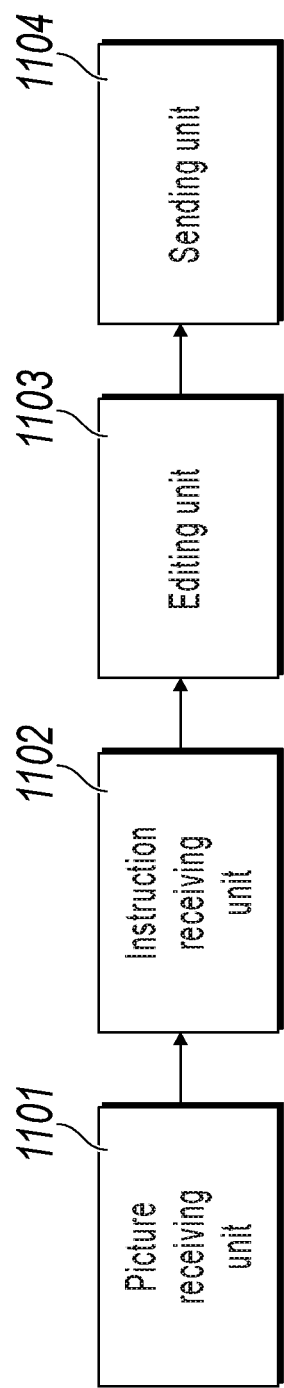
FIG. 11 is a schematic structural diagram illustrating an instant-messaging-based emoji picture sending device according to an implementation of the present application.

FIG. 11 is a schematic structural diagram illustrating an instant-messaging-based emoji picture sending device according to this implementation of the present application. The picture sending device includes a picture sending unit 1101, an instruction receiving unit 1102, an editing unit 1103, and a sending unit 1104.

The picture receiving unit 1101 receives an emoji picture sent by a second communications client device.

The instruction receiving unit 1102 receives an editing instruction for the emoji picture.

The editing unit 1103 edits the emoji picture based on the editing instruction in a session window where a first communications client device interacts with the second communications client device, to obtain an edited emoji picture.

The sending unit 1104 sends the edited emoji picture to the second communications client device.

That the instruction receiving unit 1102 receives an editing instruction for the emoji picture includes: when detecting a specified operation performed by a user on the emoji picture, displaying editing options for editing the emoji picture in the session window, where the specified operation includes a tap/click operation, a double-tap/click operation, or a touch and hold operation; and receiving the editing instruction for the emoji picture, where the editing instruction is obtained by the user by selecting one editing option.

The editing options are displayed at a floating layer or in a drop-down menu in the session window, and the editing options include at least one of inverse, blurring, deformation, and rotation.

Figure 12:
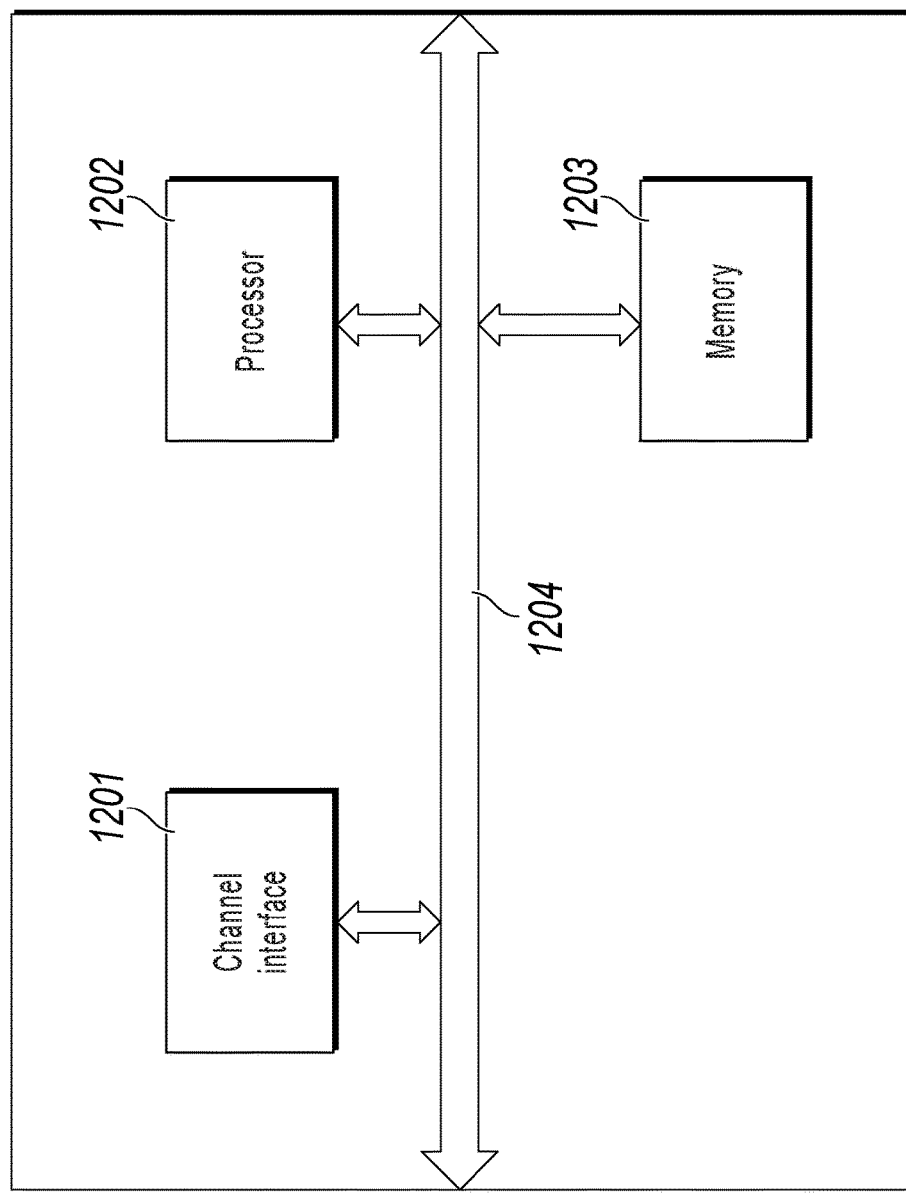
FIG. 12 is a schematic structural diagram illustrating an instant-messaging-based emoji picture sending apparatus according to an implementation of the present application.

FIG. 12 is a schematic structural diagram illustrating an instant-messaging-based emoji picture sending apparatus according to this implementation of the present application. An apparatus 1200 can include a channel interface 1201, a processor 1202, and optionally include a memory 1203.

The channel interface 1201, the processor 1202, and the memory 1203 can be connected to each other by using a bus 1204. The bus 1204 can be an Industry Standard Architecture (ISA) bus, a Peripheral Component Interconnect (PCI) bus, an Extended Industry Standard Architecture (EISA) bus, etc. The buses can be classified into an address bus, a data bus, a control bus, etc. For ease of representation, the bus is represented by using only a bidirectional arrow in FIG. 12, but it does not indicate that there is only one bus or only one type of bus.

Optionally, the memory 1203 is configured to store a program. The program can include program code, and the program code includes a computer operation instruction. The memory 1203 can include a read-only memory and a random access memory, and provide an instruction and data for the processor 1202. The memory 1203 can include a high-speed random access memory (RAM), and can further include a non-volatile memory (non-volatile memory), such as at least one disk memory.

The processor 1202 is configured to perform the following operations. Optionally, the processor 1202 executes the program stored in the memory 1203, and specifically performs the following operations: receiving an emoji picture sent by a second communications client device; receiving an editing instruction for the emoji picture; editing the emoji picture based on the editing instruction in a session window, where a first communications client device interacts with the second communications client device, to obtain an edited emoji picture; and sending the edited emoji picture to the second communications client device.

The previous methods, disclosed in the implementations shown in FIG. 2, FIG. 3 to FIG. 6, and FIG. 10 and FIG. 11 in the present application, performed by an instant-messaging-based emoji picture sending device or a master node can be applied to the processor 1202, or be implemented by the processor 1202. The processor 1202 can be an integrated circuit chip, and has a signal processing capability. In an implementation process, the steps in the previous methods can be completed by using an integrated logic circuit of hardware in the processor 1202 or by using an instruction in a software form. The processor 1202 can be a general purpose processor, including a central processing unit (CPU), a network processor (NP), etc.; can be a digital signal processor (DSP), an application-specific integrated circuit (ASIC), a field programmable gate array (FPGA); or another programmable logic device, a discrete gate or a transistor logic device, a discrete hardware component, etc. The processor 1202 can implement or perform the methods, steps, and logical block diagrams disclosed in the implementations of the present application. The general purpose processor can be a microprocessor, or any conventional processor, etc. The steps of the methods disclosed with reference to the implementations of the present application can be directly performed by a hardware decoding processor, or performed by a combination of hardware and software modules in a decoding processor. The software module can be located in a mature storage medium in the art, such as a random access memory, a flash memory, a read-only memory, a programmable read-only memory or an electrically erasable programmable memory, or a register. The storage medium is located in the memory 1203, and the processor 1202 reads information from the memory 1203 and completes the steps in the previous methods in combination with the hardware of the processor 1202.

The instant-messaging-based emoji picture sending apparatus 1200 can further perform the method in FIG. 2, and implement the method performed by the master node.

This implementation of the present application further provides a computer readable storage medium. The computer readable storage medium stores one or more programs, and the one or more programs include an instruction. When the instruction is executed by a portable electronic device that includes a plurality of application programs, the portable electronic device can perform the method described in FIG. 2.

Implementation 7

Figure 13:
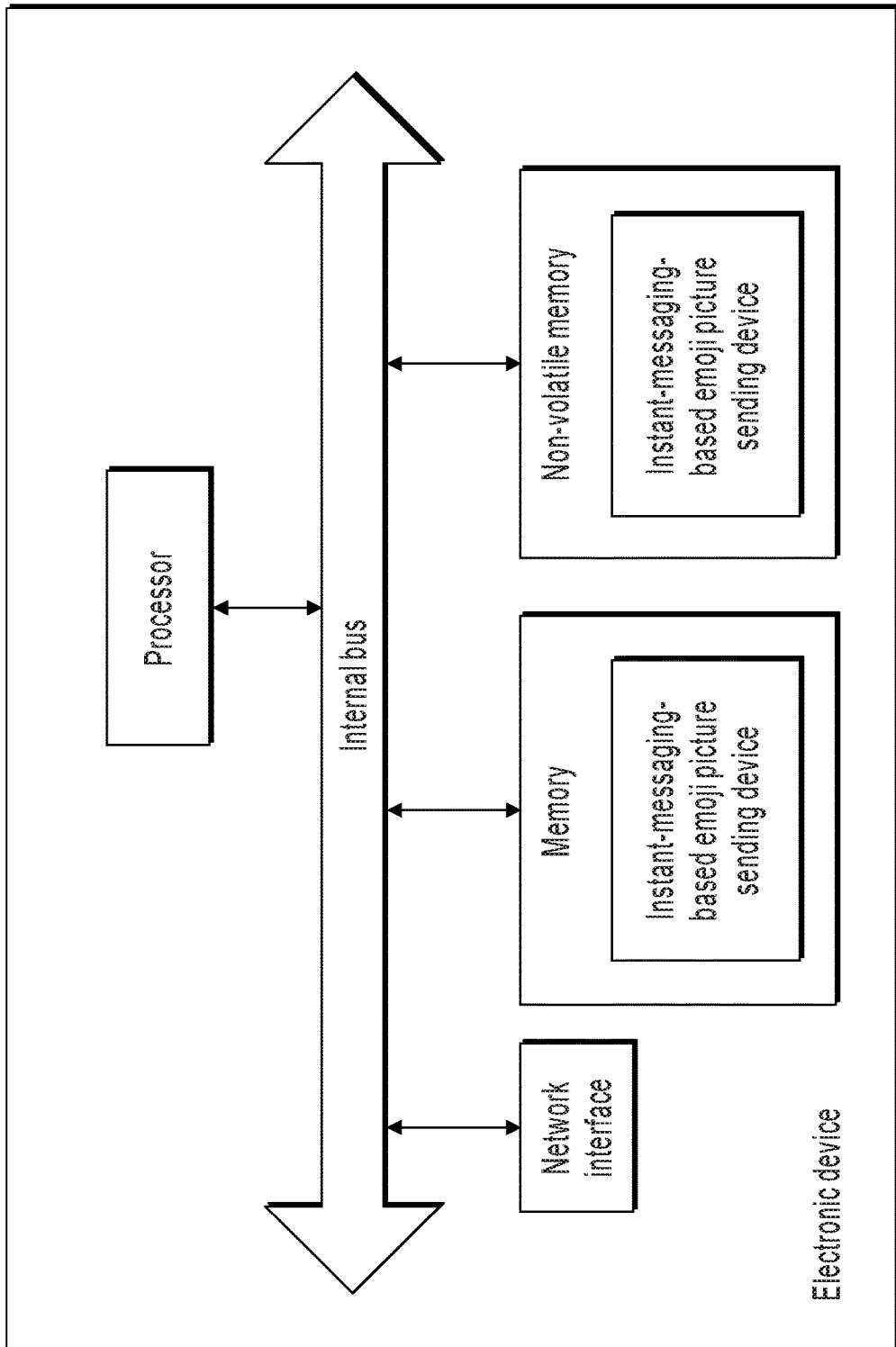
FIG. 13 is a schematic structural diagram illustrating an electronic device according to an implementation of the present application.

FIG. 13 is a schematic structural diagram illustrating an electronic device according to this implementation of the present application.

The structural diagram of the electronic device described in this implementation of the present disclosure can be the same as the structural diagram of the electronic device shown in FIG. 10. Details are not described here again.

Figure 14:
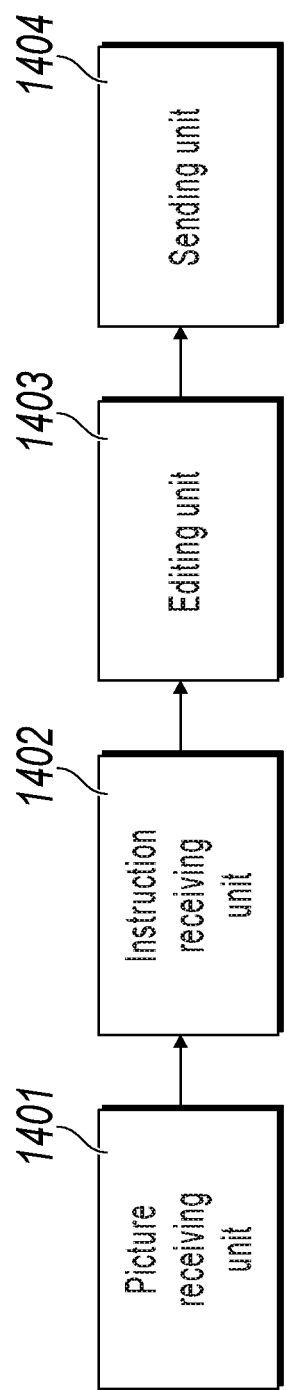
FIG. 14 is a schematic structural diagram illustrating an instant-messaging-based emoji picture sending device according to an implementation of the present application.

FIG. 14 is a schematic structural diagram illustrating an instant-messaging-based emoji picture sending device according to this implementation of the present application. The picture sending device includes a picture receiving unit 1401, an instruction receiving unit 1402, an editing unit 1403, and a sending unit 1404.

The picture receiving unit 1401 receives, in a session window, an emoji picture sent by a second communications client device, where the session window is a session window of a group.

The instruction receiving unit 1402 receives an editing instruction for the emoji picture.

The editing unit 1403 edits the emoji picture in the session window based on the editing instruction, to obtain an edited emoji picture.

The sending unit 1404 sends the edited emoji picture in the session window.

Figure 15:
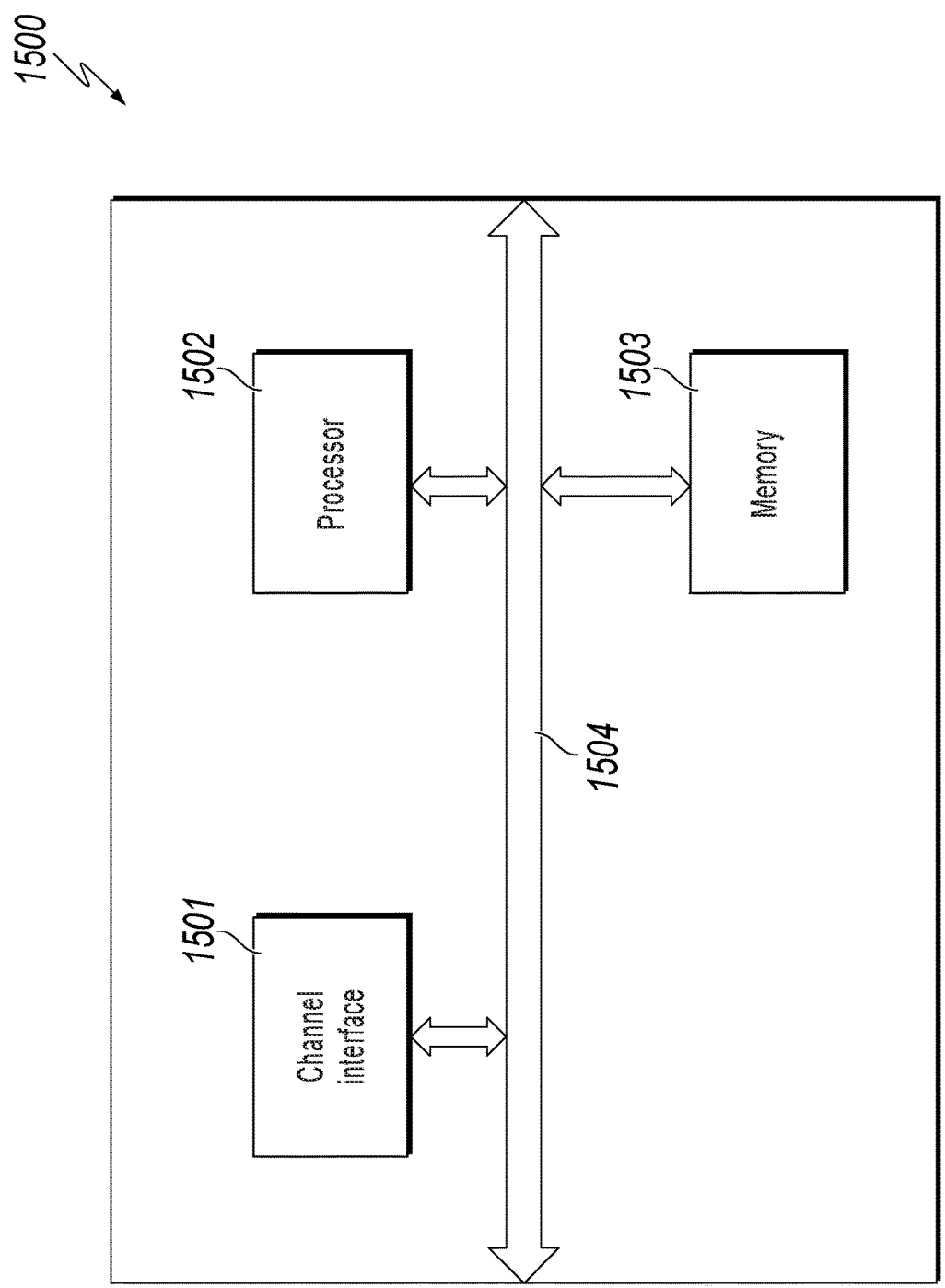
FIG. 15 is a schematic structural diagram illustrating an instant-messaging-based emoji picture sending apparatus according to an implementation of the present application.

FIG. 15 is a schematic structural diagram illustrating an instant-messaging-based emoji picture sending apparatus according to this implementation of the present application. An apparatus 1500 can include a channel interface 1501, a processor 1502, and optionally include a memory 1503.

The channel interface 1501, the processor 1502, and the memory 1503 can be connected to each other by using a bus 1504. The bus 1504 can be an Industry Standard Architecture (ISA) bus, a Peripheral Component Interconnect (PCI) bus, an Extended Industry Standard Architecture (EISA) bus, etc. The buses can be classified into an address bus, a data bus, a control bus, etc. For ease of representation, the bus is represented by using only a bidirectional arrow in FIG. 15, but it does not indicate that there is only one bus or only one type of bus.

Optionally, the memory 1503 is configured to store a program. The program can include program code, and the program code includes a computer operation instruction. The memory 1503 can include a read-only memory and a random access memory, and provide an instruction and data for the processor 1502. The memory 1503 can include a high-speed random access memory (RAM), and can further include a non-volatile memory (non-volatile memory), such as at least one disk memory.

The processor 1502 is configured to perform the following operations. Optionally, the processor 1502 executes the program stored in the memory 1503, and specifically performs the following operations: receiving, in a session window, an emoji picture sent by a second communications client device, where the session window is a session window of a group; receiving an editing instruction for the emoji picture; editing the emoji picture in the session window based on the editing instruction, to obtain an edited emoji picture; and sending the edited emoji picture in the session window.

The previous methods, disclosed in the implementations shown in FIG. 2, FIG. 3 to FIG. 6, and FIG. 13 and FIG. 14 in the present application, performed by an instant-messaging-based emoji picture sending device or a master node can be applied to the processor 1502, or be implemented by the processor 1502. The processor 1502 can be an integrated circuit chip, and has a signal processing capability. In an implementation process, the steps in the previous methods can be completed by using an integrated logic circuit of hardware in the processor 1502, or by using an instruction in a software form. The processor 1502 can be a general purpose processor, including a central processing unit (CPU), a network processor (NP), etc.; can be a digital signal processor (DSP), an application-specific integrated circuit (ASIC), a field programmable gate array (FPGA); or another programmable logic device, a discrete gate or a transistor logic device, a discrete hardware component, etc. The processor 1502 can implement or perform the methods, steps, and logical block diagrams disclosed in the implementations of the present application. The general purpose processor can be a microprocessor, or any conventional processor, etc. The steps of the methods disclosed with reference to the implementations of the present application can be directly performed by a hardware decoding processor, or performed by a combination of hardware and software modules in a decoding processor. The software module can be located in a mature storage medium in the art, such as a random access memory, a flash memory, a read-only memory, a programmable read-only memory or an electrically erasable programmable memory, or a register. The storage medium is located in the memory 1503, and the processor 1502 reads information from the memory 1503 and completes the steps in the previous methods in combination with the hardware of the processor 1502.

The instant-messaging-based emoji picture sending apparatus 1500 can further perform the method in FIG. 2, and implement the method performed by the master node.

This implementation of the present application further provides a computer readable storage medium. The computer readable storage medium stores one or more programs, and the one or more programs include an instruction. When the instruction is executed by a portable electronic device that includes a plurality of application programs, the portable electronic device can perform the method described in FIG. 2.

Implementation 8

Figure 16:
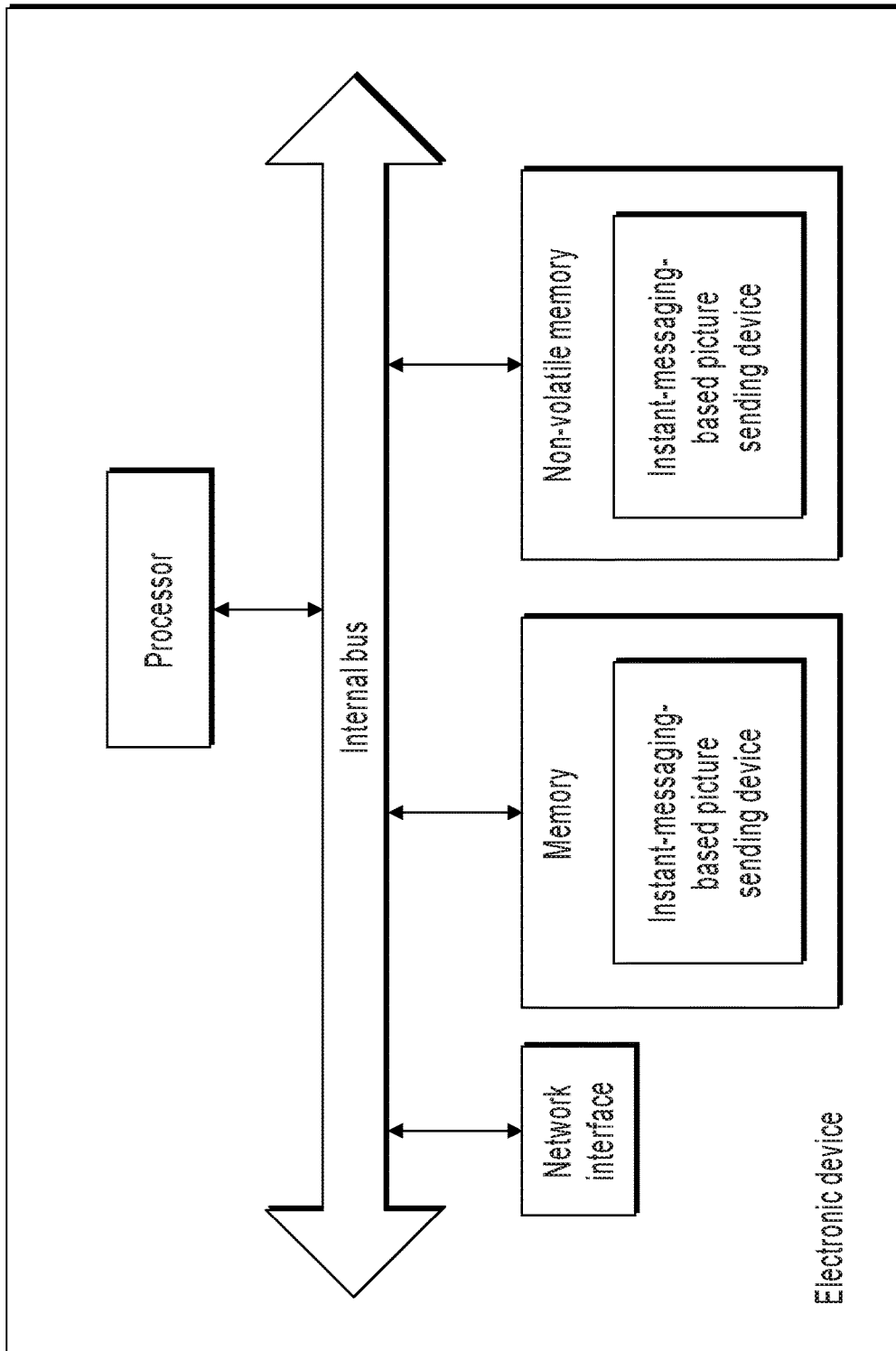
FIG. 16 is a schematic structural diagram illustrating an electronic device according to an implementation of the present application.

FIG. 16 is a schematic structural diagram illustrating an electronic device according to this implementation of the present application.

The electronic device provided in this implementation of the present application logically forms an instant-messaging-based picture sending device. Other structures are the same as the electronic device shown in FIG. 10, and details are not described here again.

Figure 17:
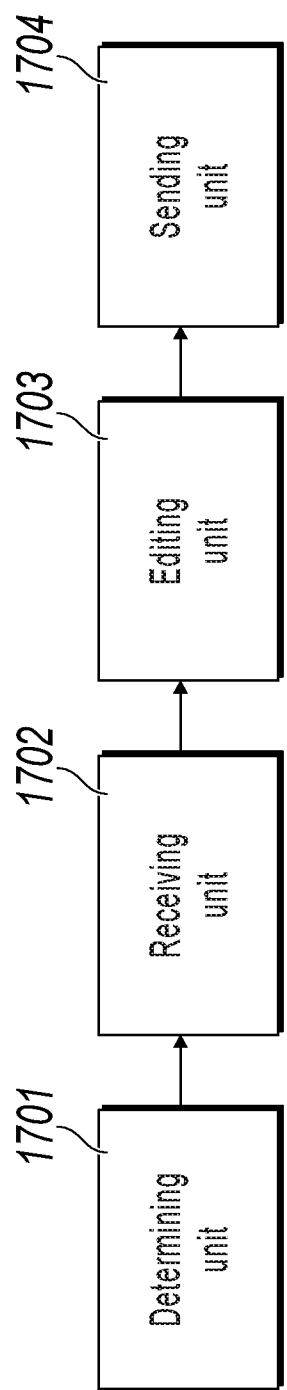
FIG. 17 is a schematic structural diagram illustrating an instant-messaging-based picture sending device according to an implementation of the present application.

FIG. 17 is a schematic structural diagram illustrating an instant-messaging-based picture sending device according to this implementation of the present application. The picture sending device includes a determining unit 1701, a receiving unit 1702, an editing unit 1703, and a sending unit 1704.

The determining unit 1701 determines a target picture.

The receiving unit 1702 receives an editing instruction for the target picture.

The editing unit 1703 edits the target picture in a session window based on the editing instruction, to obtain an edited picture, where the session window is a session window, where a first communications client device interacts with another communications client, or a session window where a first communications client device interacts with other communications clients.

The sending unit 1704 sends the edited picture in the session window.

That the determining unit 1701 determines a target picture includes: receiving a picture sent by a second communications client device, and determining the picture sent by the second communications client device as the target picture; or determining a picture that has been sent to a second communications client device, and determining the sent picture as the target picture; or determining a picture included in a picture library, and determining the picture as the target picture.

That the receiving unit 1702 receives an editing instruction for the target picture includes: monitoring an operation performed by a user on the target picture, where the user is a user who uses the first communications client device; when detecting that the user performs a specified operation on the target picture, displaying editing options for editing the target picture in the session window; and receiving the editing instruction for the target picture from the user, where the editing instruction is obtained by the user by selecting one editing option.

In this implementation of the present application, the specified operation detected by the receiving unit 1702 includes a tap/click operation, a double-tap/click operation, or a touch and hold operation.

The editing options are displayed at a floating layer or in a drop-down menu in the session window, and the editing options include at least one of inverse, blurring, deformation, and rotation.

In another implementation of the present application, the picture sending device further includes a preview unit 1705.

The preview unit 1705 displays the edited picture after the editing unit 1703 obtains the edited picture and before the sending unit 1704 sends the edited picture, so that the user previews the edited picture.

In another implementation of the present application, that the preview unit 1705 displays the edited picture includes: displaying a setting option to the user, where the setting option is used by the user to set an attribute of the edited picture; receiving a setting instruction sent by the user, where the setting instruction is obtained by the user by selecting the setting option; and setting the edited picture in the session window based on the setting instruction, to obtain a specified picture.

That the sending unit 1704 sends the edited picture in the session window includes: receiving an acknowledgment instruction sent by the user, where the acknowledgment instruction is sent by the user after the user previews the edited picture; and sending the edited picture based on the acknowledgment instruction in the session window.

Figure 18:
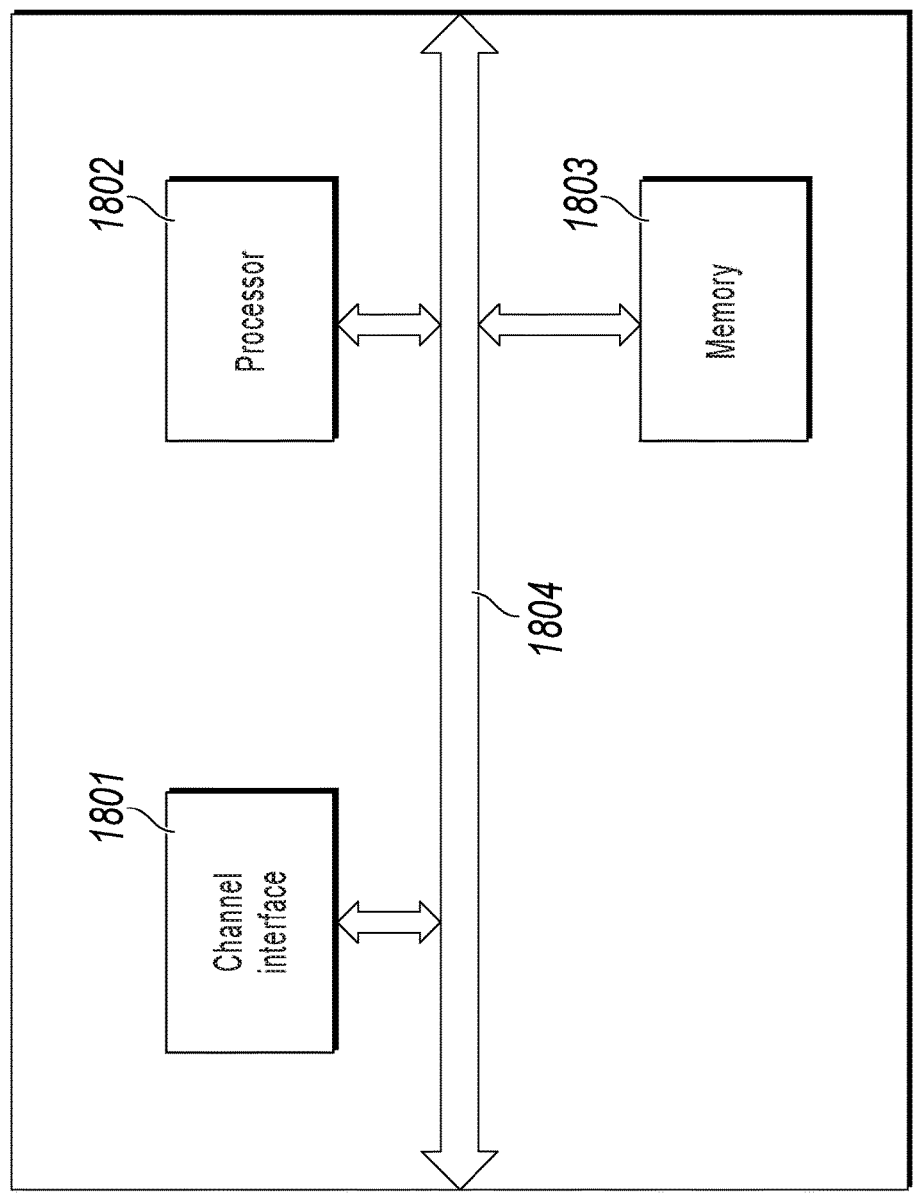
FIG. 18 is a schematic structural diagram illustrating an instant-messaging-based picture sending apparatus according to an implementation of the present application.

FIG. 18 is a schematic structural diagram illustrating an instant-messaging-based picture sending apparatus according to this implementation of the present application. An apparatus 1800 can include a channel interface 1801, a processor 1802, and optionally include a memory 1803.

The channel interface 1801, the processor 1802, and the memory 1803 can be connected to each other by using a bus 1804. The bus 1804 can be an Industry Standard Architecture (ISA) bus, a Peripheral Component Interconnect (PCI) bus, an Extended Industry Standard Architecture (EISA) bus, etc. The buses can be classified into an address bus, a data bus, a control bus, etc. For ease of representation, the bus is represented by using only a bidirectional arrow in FIG. 18, but it does not indicate that there is only one bus or only one type of bus.

Optionally, the memory 1803 is configured to store a program. The program can include program code, and the program code includes a computer operation instruction. The memory 1803 can include a read-only memory and a random access memory, and provide an instruction and data for the processor 1802. The memory 1803 can include a high-speed random access memory (RAM), and can further include a non-volatile memory (non-volatile memory), for example, at least one disk memory.

The processor 1802 is configured to perform the following operations. Optionally, the processor 1802 executes the program stored in the memory 1803, and specifically performs the following operations: determining a target picture; receiving an editing instruction for the target picture; editing the target picture in a session window based on the editing instruction, to obtain an edited picture, where the session window is a session window where a first communications client device interacts with another communications client, or a session window, where a first communications client device interacts with other communications clients; and sending the edited picture in the session window.

The previous methods, disclosed in the implementations shown in FIG. 7 and FIG. 16 and FIG. 17 in the present application, performed by an instant-messaging-based picture sending device or a master node can be applied to the processor 1802, or be implemented by the processor 1802. The processor 1802 can be an integrated circuit chip, and has a signal processing capability. In an implementation process, the steps in the previous methods can be completed by using an integrated logic circuit of hardware in the processor 1802, or by using an instruction in a software form. The processor 1802 can be a general purpose processor, including a central processing unit (CPU), a network processor (NP), etc.; can be a digital signal processor (DSP), an application-specific integrated circuit (ASIC), a field programmable gate array (FPGA); or another programmable logic device, a discrete gate or a transistor logic device, a discrete hardware component, etc. The processor 1802 can implement or perform the methods, steps, and logical block diagrams disclosed in the implementations of the present application. The general purpose processor can be a microprocessor, or any conventional processor, etc. The steps of the methods disclosed with reference to the implementations of the present application can be directly performed by a hardware decoding processor, or performed by a combination of hardware and software modules in a decoding processor. The software module can be located in a mature storage medium in the art, such as a random access memory, a flash memory, a read-only memory, a programmable read-only memory or an electrically erasable programmable memory, or a register. The storage medium is located in the memory 1803, and the processor 1802 reads information from the memory 1803 and completes the steps in the previous methods in combination with the hardware of the processor 1802.

The instant-messaging-based picture sending apparatus 1800 can further perform the method in FIG. 7, and implement the method performed by the master node.

This implementation of the present application further provides a computer readable storage medium. The computer readable storage medium stores one or more programs, and the one or more programs include an instruction. When the instruction is executed by a portable electronic device that includes a plurality of application programs, the portable electronic device can perform the method described in FIG. 7.

Implementation 9

Figure 19:
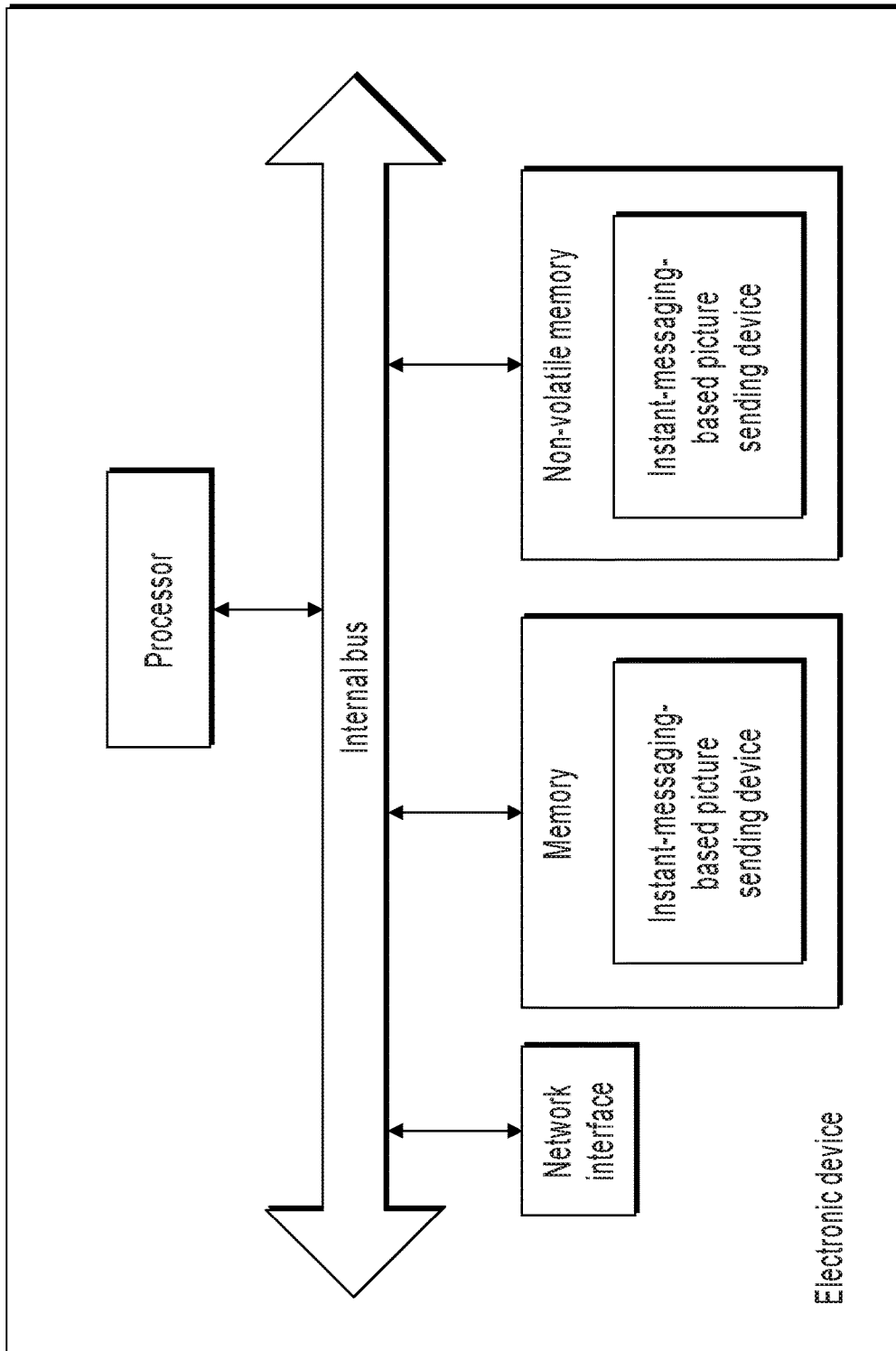
FIG. 19 is a schematic structural diagram illustrating an electronic device according to an implementation of the present application.

FIG. 19 is a schematic structural diagram illustrating an electronic device according to this implementation of the present application.

The electronic device provided in this implementation of the present application logically forms an instant-messaging-based picture sending device. Other structures are the same as the electronic device shown in FIG. 10, and details are not described here again.

Figure 20:
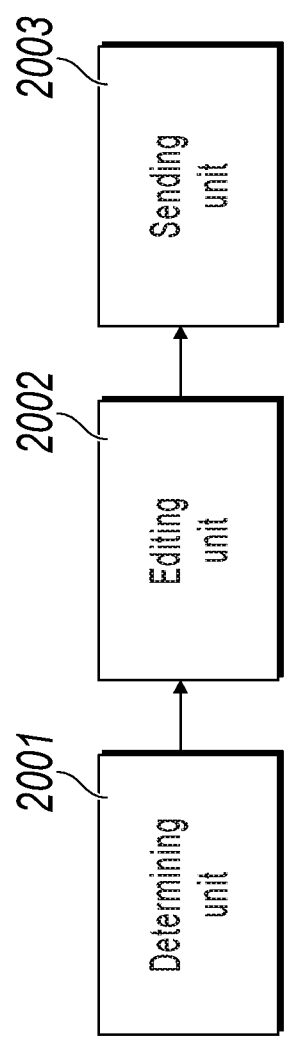
FIG. 20 is a schematic structural diagram illustrating an instant-messaging-based picture sending device according to an implementation of the present application.

FIG. 20 is a schematic structural diagram illustrating an instant-messaging-based picture sending device according to this implementation of the present application. The picture sending device includes a determining unit 2001, an editing unit 2002, and a sending unit 2003.

The determining unit 2001 determines a target picture.

The receiving unit 2002 edits the target picture in a session window based on attribute information of a user who uses a first communications client device, to obtain an edited picture, where the session window is a session window, where the first communications client device interacts with another communications client, or a session window where the first communications client device interacts with other communications clients.

The sending unit 2003 sends the edited picture in the session window.

Figure 21:
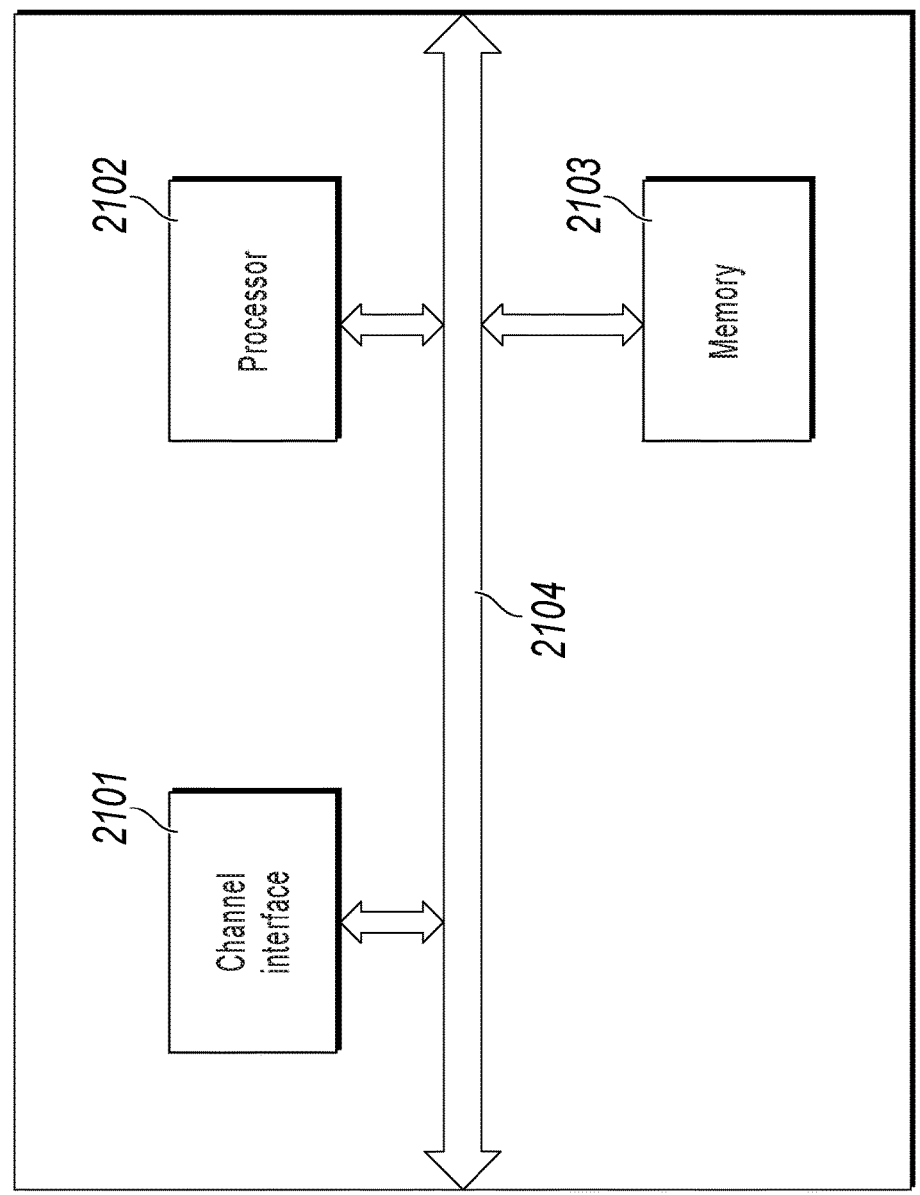
FIG. 21 is a schematic structural diagram illustrating an instant-messaging-based picture sending apparatus according to an implementation of the present application.

FIG. 21 is a schematic structural diagram illustrating an instant-messaging-based picture sending apparatus according to this implementation of the present application. An apparatus 2100 can include a channel interface 2101, a processor 2102, and optionally include a memory 2103.

The channel interface 2101, the processor 2102, and the memory 2103 can be connected to each other by using a bus 2104. The bus 2104 can be an Industry Standard Architecture (ISA) bus, a Peripheral Component Interconnect (PCI) bus, an Extended Industry Standard Architecture (EISA) bus, etc. The buses can be classified into an address bus, a data bus, a control bus, etc. For ease of representation, the bus is represented by using only a bidirectional arrow in FIG. 21, but it does not indicate that there is only one bus or only one type of bus.

Optionally, the memory 2103 is configured to store a program. The program can include program code, and the program code includes a computer operation instruction. The memory 2103 can include a read-only memory and a random access memory, and provide an instruction and data for the processor 2102. The memory 2103 can include a high-speed random access memory (RAM), and can further include a non-volatile memory (non-volatile memory), for example, at least one disk memory.

The processor 2102 is configured to perform the following operations. Optionally, the processor 2102 executes the program stored in the memory 2103, and specifically performs the following operations: determining a target picture; editing the target picture in a session window based on attribute information of a user who uses a first communications client device, to obtain an edited picture, where the session window is a session window, where the first communications client device interacts with another communications client, or a session window where the first communications client device interacts with other communications clients; and sending the edited picture in the session window.

The previous methods, disclosed in the implementations shown in FIG. 9 and FIG. 19 and FIG. 20 in the present application, performed by an instant-messaging-based picture sending device or a master node can be applied to the processor 2102, or be implemented by the processor 2102. The processor 2102 can be an integrated circuit chip, and has a signal processing capability. In an implementation process, the steps in the previous methods can be completed by using an integrated logic circuit of hardware in the processor 2102 or by using an instruction in a software form. The processor 2102 can be a general purpose processor, including a central processing unit (CPU), a network processor (NP), etc.; can be a digital signal processor (DSP), an application-specific integrated circuit (ASIC), a field programmable gate array (FPGA); or another programmable logic device, a discrete gate or a transistor logic device, a discrete hardware component, etc. The processor 2102 can implement or perform the methods, steps, and logical block diagrams disclosed in the implementations of the present application. The general purpose processor can be a microprocessor, or any conventional processor, etc. The steps of the methods disclosed with reference to the implementations of the present application can be directly performed by a hardware decoding processor, or performed by a combination of hardware and software modules in a decoding processor. The software module can be located in a mature storage medium in the art, such as a random access memory, a flash memory, a read-only memory, a programmable read-only memory or an electrically erasable programmable memory, or a register. The storage medium is located in the memory 2103, and the processor 2102 reads information from the memory 2103 and completes the steps in the previous methods in combination with the hardware of the processor 2102.

The instant-messaging-based picture sending apparatus 2100 can further perform the method in FIG. 9, and implement the method performed by the master node.

This implementation of the present application further provides a computer readable storage medium. The computer readable storage medium stores one or more programs, and the one or more programs include an instruction. When the instruction is executed by a portable electronic device that includes a plurality of application programs, the portable electronic device can perform the method described in FIG. 9.

The specific implementations of the present specification have been described previously. Other implementations fall within the scope of the appended claims. In some cases, actions or steps described in the claims can be performed in a sequence different from that in the implementations and a desired result can still be obtained. In addition, the process described in the accompanying drawings does not necessarily require a specific order or sequence to obtain the desired result. In some implementations, multitask processing and parallel processing are also possible or may be advantageous.

In the 1990s, it can be distinguished whether improvement on a technology is hardware improvement (for example, improvement on a circuit structure such as a diode, a transistor, or a switch) or software improvement (improvement on a method process). However, with the development of technologies, current improvement on many method processes has already been considered as direct improvement on a hardware circuit structure. Almost all designers program the improved method process into a hardware circuit to obtain the corresponding hardware circuit structure. Therefore, it cannot be said that improvement on a method process cannot be implemented by using a hardware entity module. For example, a programmable logic device (PLD) (for example, a field programmable gate array (FPGA)) is such an integrated circuit, and the logical function of the programmable logic device is determined by a user by programming a device. The designers perform voluntary programming to "integrate" a digital system into a single PLD without requiring a chip manufacturer to design and formulate a dedicated integrated circuit chip. In addition, currently, instead of manually formulating an integrated circuit chip, this type of programming is mostly implemented by "logic compiler" software. The software is similar to a software compiler during program development and writing, and original code needs to be written by using a specific programming language before being compiled. The programming language is referred to as a hardware description language (HDL), and there are a plurality of types of HDL, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). Currently, Very-High-Speed Integrated Circuit Hardware Description Language (VHDL) and Verilog are most commonly used. It should also be clear to a person skilled in the art that the method process only needs to be logically programmed by using the previous several types of hardware description language and programmed into an integrated circuit, so that a hardware circuit that implements the logical method process can be easily obtained.

A controller can be implemented by using any suitable method. For example, the controller can be a microprocessor or a processor, or a computer readable medium, a logic gate, a switch, an application-specific integrated circuit (ASIC), a programmable logic controller, and an embedded microprocessor that store computer readable program code (such as software or firmware) that can be executed by the (micro) processor. Examples of the controller include but are not limited to the following microprocessors: ARC 625D, Atmel AT91SAM, Microchip PIC18F26K20, and Silicon Labs C8051F320. A controller of a memory can further be implemented as a part of control logic of the memory. A person skilled in the art also knows that, in addition to implementing the controller merely by using the computer readable program code, method steps can be logically programmed so that the controller implements a same function by using a logic gate, a switch, an application-specific integrated circuit, a programmable logic controller, an embedded microcontroller, etc. Therefore, such a controller can be considered as a hardware component, and an apparatus that is included in the controller and that is configured to implement various functions can also be considered as a structure inside the hardware component. Or the apparatus configured to implement various functions can even be considered as both a software module for implementing the method and a structure inside the hardware component.

The system, apparatus, module, or unit described in the previous implementations can be specifically implemented by a computer chip or an entity, or implemented by a product that has a particular function. A typical implementation device is a computer. The computer can be, for example, a personal computer, a laptop computer, a cellular phone, a camera phone, a smartphone, a personal digital assistant, a media player, a navigation device, an email device, a game controller, a tablet computer, a wearable device, or a combination of any of these devices.

For ease of description, the previous apparatus is described by dividing the functions into various units. Certainly, during implementation of the present application, functions of the units can be implemented in same or a plurality of pieces of software and/or hardware.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product implemented on one or more computer-usable storage media (including but not limited to a disk memory, a CD-ROM, an optical memory, etc.) that include computer usable program code.

The present application is described with reference to the flowcharts and/or block diagrams of the method, the device (system), and the computer program product based on the implementations of the present application. It should be understood that computer program instructions can be used to implement each process and/or each block in the flowcharts and/or the block diagrams, and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions can be stored in a computer readable memory that can instruct the computer or any other programmable data processing device to work in a specific way, so that the instructions stored in the computer readable memory generate an artifact that includes an instruction apparatus. The instruction apparatus implements a specified function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, a tape and disk storage or another magnetic storage device, or any other non-transmission media that can be used to store information that a computing device can access. Based on the definition in the present specification, the computer readable medium does not include transitory media such as a modulated data signal and carrier.

It is worthwhile to further note that, the terms "include", "comprise", or their any other variants are intended to cover a non-exclusive inclusion, so that a process, a method, a commodity, or a device that includes a list of elements not only includes those elements but also includes other elements which are not expressly listed; or further includes elements inherent to such process, method, commodity, or device. Without more constraints, an element limited by the sentence "includes a . . . " further includes another identical element in the process, method, commodity, or device that includes the element.

The present application can be described in the general context of computer executable instructions executed by a computer, for example, a program module. Generally, the program module includes a routine, a program, an object, a component, a data structure, etc., for executing a particular task or implementing a particular abstract data type. The present application can also be practiced in distributed computing environments where tasks are performed by remote processing devices that are connected by using a communications network. In a distributed computing environment, program modules can be located in both local and remote computer storage media, including storage devices.

The implementations in the present specification are all described progressively, for same or similar parts in the implementations, reference can be made to these implementations, and each implementation focuses on a difference from other implementations. Especially, a system implementation is basically similar to a method implementation, and therefore, is described briefly. For related parts, refer to partial descriptions in the method implementation.

The previous implementations are merely implementations of the present application, and are not intended to limit the present application. A person skilled in the art can make various modifications and variations to the present application. Any modification, equivalent replacement, or improvement made without departing from the spirit and the principle of the present application shall fall within the scope of the claims of the present application.

Figure 22:
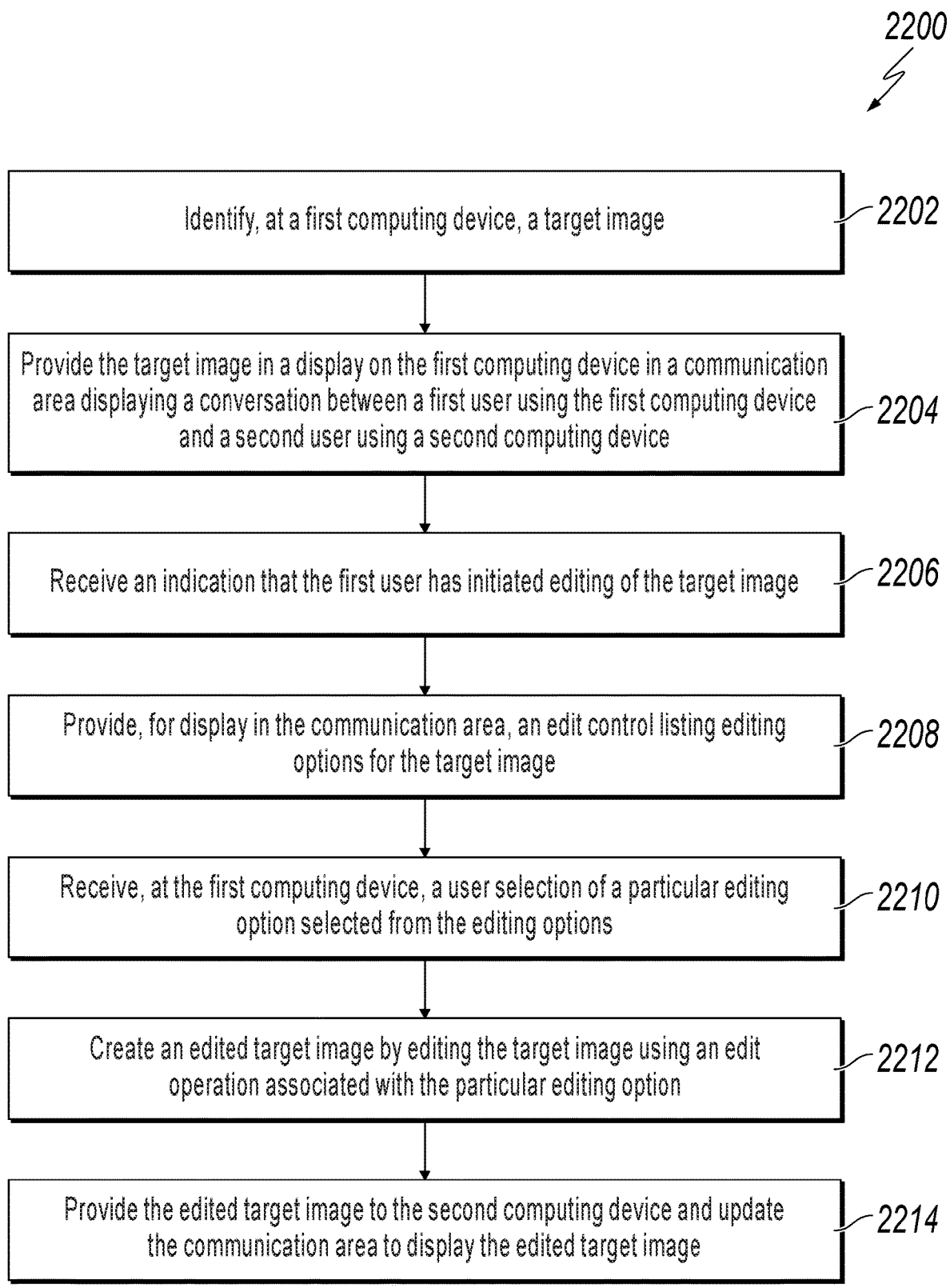
FIG. 22 is a flowchart illustrating an example of a computer-implemented method for providing an edited image, according to an implementation of the present disclosure.

FIG. 22 is a flowchart illustrating an example of a computer-implemented method 2200 for providing an edited image, according to an implementation of the present disclosure. For clarity of presentation, the description that follows generally describes method 2200 in the context of the other figures in this description. However, it will be understood that method 2200 can be performed, for example, by any system, environment, software, and hardware, or a combination of systems, environments, software, and hardware, as appropriate. In some implementations, various steps of method 2200 can be run in parallel, in combination, in loops, or in any order.

At 2202, a target image is identified at a first computing device. For example, as shown in FIG. 3, a cat image (for example, an emoji of a cat or a photo of a cat) can be received at a first device. The cat image can be displayed, for example, when received as part of a message that is part of, and sent during, a messaging conversation that is displayed to a user of a mobile device executing a messaging application.

In some implementations, the target image can be identified in various ways. For example, the target image can be received at the first computing device (as shown in FIG. 3) from the second computing device. In another example, the target image can be identified, at the first computing device, from an image library. For example, the user of the messaging application can use controls provided by the messaging application to select an image from an image library on the mobile device. In another example, the image can be available through the Internet or other networked source. From 2202, method 2200 proceeds to 2204.

At 2204, the target image is provided in a display on the first computing device in a communication area displaying a conversation between a first user using the first computing device and a second user using a second computing device. For example, referring to FIG. 3, the communication area can be a session window (provided by a messaging application) in which the cat image appears. From 2204, method 2200 proceeds to 2206.

At 2206, an indication is received that the first user has initiated editing of the target image. As an example, referring to FIG. 3, the messaging application can receive an indication that the user has used a touch screen of the mobile device to select the cat image for editing. The selection can be, for example, a double-click, a touch and hold, an option selected from a menu, or some other selection technique. From 2206, method 2200 proceeds to 2208.

At 2208, an edit control listing editing options for the target image is provided for display in the communication area. For example, referring to FIG. 4, the messaging application can provide, for display in the session window, a floating window or other display element, that lists editing options. The list of the editing options can include inverse, blurring, deformation, and rotation. From 2208, method 2200 proceeds to 2210.

At 2210, a user selection of a particular editing option selected from the editing options is received at the first computing device. For example, referring to FIG. 4, an inverse function can be selected by the user form the list of editing options. The selection can be made, for example, by using the touch screen to touch on the inverse editing option. Other selection techniques can be used, for example, including using mouse or keyboard selection. From 2210, method 2200 proceeds to 2212.

At 2212, an edited target image is created by editing the target image using an edit operation associated with the particular editing option. For example, the edit operation can be a tap/click operation, a double-tap/click operation, or a touch and hold operation. For inverting a cat image, the edit operation can be the selection of the inverse editing option itself. For blurring the cat image, the edit operation can be a touch and hold operation that blurs the cat image to a blurriness level based on a length of time of the touch and hold. In another example, touching on the cat image can cycle the cat image through increasing levels of blurriness. Other controls can be provided for reducing, reversing, or canceling the blurriness. For deforming the cat image, the edit operation can be a touch and drag operation that pulls a portion of the image in the direction of the drag operation, causing the cat image to be stretched. The messaging application can use the results of the user's input and the edit operation to create an updated image. As an example, referring to FIG. 5, an inverted cat image can be created after user selection of the inverse edit option and completion of the edit operation. From 2212, method 2200 proceeds to 2214.

At 2214, the edited target image is provided to the second computing device, and the communication area is updated to display the edited target image. For example, after the user has performed the edit operation and the inverted cat image has been created, the first computing device can provide the edited image to the second computing device. FIG. 5, for example, shows both sides of the conversation. At the second computing device, the left and right sides of the displayed conversation would be reversed. From 2214, method 2200 stops.

In some implementations, method 2200 can include steps for previewing and confirming the edited target image before it is provided to the second computing device. For example, the edited target image can be provided for preview by the first user on the first computing device. The first user may, for example, decide that the inversed, blurred, or deformed cat image is not to be sent, such as if the first user is not satisfied with the result of the edit operation and the visual appearance of the result. If the first computing device receives a user confirmation, however, then the first computing device can proceed with sending the edited target image to the second computing device.

In some implementations, method 2200 can include steps for saving edited images. For example, the first user can decide that one or more edited images are to be locally saved on the first computing device, such as in a library, or stored in a location accessible to the first computing device. Stored images can be made accessible for selection in messaging and other applications, such as for insertion of an edited emoji or an edited photo into a message or other document.

Techniques described in the present disclosure can make it easier for users to create, edit, and manage images, such as emojis and photos that are sent and received in messaging applications. For example, after a user using a computing device receives an emoji, the user can create a new, edited version of the emoji without having to search for an emoji from a library. This can give the user flexibility, for example, in the creation of new emojis that are custom-made by the user. This can occur, for example, using simplified operations, without exiting the messaging application or without having to have access to an extensive library of emojis.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    displaying a target image in a display on a first computing device in a communication area displaying an instant messaging conversation between a first user using the first computing device and a second user using a second computing device, wherein the target image is received from the second computing device;
    receiving an indication that the first user has initiated editing of the target image displayed within the communication area;
    displaying, in the communication area, an edit control listing editing options for the target image displayed within the communication area;
    receiving, at the first computing device, a user selection of a particular editing option selected from the editing options;
    creating an edited target image by editing the target image displayed within the communication area using an edit operation associated with the particular editing option; and
    providing the edited target image to the second computing device and updating the communication area to display the edited target image.

2. The computer-implemented method of claim 1, further comprising:
    providing the edited target image for preview by the first user on the first computing device; and
    receiving a user confirmation to proceed with sending the edited target image to the second computing device.

3. The computer-implemented method of claim 1, wherein the target image is a photo or an emoji.

4. The computer-implemented method of claim 1, wherein the editing options include at least one of inverse, blurring, deformation, and rotation.

5. The computer-implemented method of claim 1, wherein the communication area is a session window in a messaging application.

6. The computer-implemented method of claim 1, wherein the edit operation is a tap/click operation, a double-tap/click operation, or a touch and hold operation.

7. A non-transitory, computer-readable medium storing one or more instructions executable by a computer system to perform operations comprising:
  displaying a target image in a display on a first computing device in a communication area displaying an instant messaging conversation between a first user using the first computing device and a second user using a second computing device, wherein the target image is received from the second computing device;
  receiving an indication that the first user has initiated editing of the target image displayed within the communication area;
  displaying, in the communication area, an edit control listing editing options for the target image displayed within the communication area;
  receiving, at the first computing device, a user selection of a particular editing option selected from the editing options;
  creating an edited target image by editing the target image displayed within the communication area using an edit operation associated with the particular editing option; and
  providing the edited target image to the second computing device and updating the communication area to display the edited target image.

8. The non-transitory, computer-readable medium of claim 7, the operations further comprising:
  providing the edited target image for preview by the first user on the first computing device; and
  receiving a user confirmation to proceed with sending the edited target image to the second computing device.

9. The non-transitory, computer-readable medium of claim 7, wherein the target image is a photo or an emoji.

10. The non-transitory, computer-readable medium of claim 7, wherein the editing options include at least one of inverse, blurring, deformation, and rotation.

11. The non-transitory, computer-readable medium of claim 7, wherein the communication area is a session window in a messaging application.

12. The non-transitory, computer-readable medium of claim 7, wherein the edit operation is a tap/click operation, a double-tap/click operation, or a touch and hold operation.

13. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    displaying a target image in a display on a first computing device in a communication area displaying an instant messaging conversation between a first user using the first computing device and a second user using a second computing device, wherein the target image is received from the second computing device;
    receiving an indication that the first user has initiated editing of the target image displayed within the communication area;
    displaying, in the communication area, an edit control listing editing options for the target image displayed within the communication area;
    receiving, at the first computing device, a user selection of a particular editing option selected from the editing options;
    creating an edited target image by editing the target image displayed within the communication area using an edit operation associated with the particular editing option; and
    providing the edited target image to the second computing device and updating the communication area to display the edited target image.

14. The computer-implemented system of claim 13, the operations further comprising:
  providing the edited target image for preview by the first user on the first computing device; and
  receiving a user confirmation to proceed with sending the edited target image to the second computing device.

15. The computer-implemented system of claim 13, wherein the target image is a photo or an emoji.

16. The computer-implemented system of claim 13, wherein the editing options include at least one of inverse, blurring, deformation, and rotation.

17. The computer-implemented system of claim 13, wherein the communication area is a session window in a messaging application.

* * * * *